United States Patent
Ando et al.

(10) Patent No.: US 10,059,323 B2
(45) Date of Patent: Aug. 28, 2018

(54) VEHICLE DRIVING SYSTEM

(71) Applicant: HONDA MOTOR CO., LTD., Tokyo (JP)

(72) Inventors: Satoshi Ando, Wako (JP); Sei Shinohara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 903 days.

(21) Appl. No.: 14/389,268

(22) PCT Filed: Mar. 19, 2013

(86) PCT No.: PCT/JP2013/057896
§ 371 (c)(1),
(2) Date: Sep. 29, 2014

(87) PCT Pub. No.: WO2013/146484
PCT Pub. Date: Oct. 3, 2013

(65) Prior Publication Data
US 2015/0065293 A1    Mar. 5, 2015

(30) Foreign Application Priority Data
Mar. 30, 2012   (JP) .............................. 2012-082933

(51) Int. Cl.
*B60W 10/08*   (2006.01)
*B60W 20/00*   (2016.01)
(Continued)

(52) U.S. Cl.
CPC ............ *B60W 20/00* (2013.01); *B60K 6/448* (2013.01); *B60K 6/52* (2013.01); *B60K 7/0007* (2013.01);
(Continued)

(58) Field of Classification Search
None
See application file for complete search history.

(56) References Cited

U.S. PATENT DOCUMENTS 6,024,182 A    2/2000  Hamada et al.
9,139,195 B2 *  9/2015  Noguchi ................. B60K 1/02
(Continued)

FOREIGN PATENT DOCUMENTS

CN    101674949 A    3/2010
JP    9-79348 A      3/1997
(Continued)

OTHER PUBLICATIONS

International Search Report dated May 14, 2013 issued in corresponding application No. PCT/JP2013/057896.
(Continued)

*Primary Examiner* — Erin D Bishop
(74) *Attorney, Agent, or Firm* — Westerman, Hattori, Daniels & Adrian, LLP

(57) ABSTRACT

A vehicle driving system includes: a left wheel driving system having a first motor and a first speed changer; a right wheel driving system having a second motor and a second speed changer; a motor controller which controls the first motor and the second motor, a rotation restricting unit which can be shifted between a released state and an applied state; and a rotation restricting unit controller which controls the rotation restricting unit. When the rotation restricting unit controller shifts the rotation restricting unit from the applied state to the released state, the motor controller controls the first motor and the second motor so that a torque sum of the first motor and the second motor approaches zero while maintaining a torque difference between the first motor and the second motor.

10 Claims, 14 Drawing Sheets

(51) Int. Cl.
*B60W 10/16* (2012.01)
*B60K 6/52* (2007.10)
*B60L 11/14* (2006.01)
*B60L 7/12* (2006.01)
*B60L 7/26* (2006.01)
*B60L 11/12* (2006.01)
*B60L 11/18* (2006.01)
*B60L 15/20* (2006.01)
*B60K 6/448* (2007.10)
*B60K 7/00* (2006.01)
*B60K 17/04* (2006.01)
*B60K 17/356* (2006.01)
*B60W 30/18* (2012.01)
*F16H 48/06* (2006.01)
*B60K 17/16* (2006.01)
*B60K 23/04* (2006.01)

(52) U.S. Cl.
CPC .......... *B60K 17/046* (2013.01); *B60K 17/356* (2013.01); *B60L 7/12* (2013.01); *B60L 7/26* (2013.01); *B60L 11/123* (2013.01); *B60L 11/14* (2013.01); *B60L 11/1861* (2013.01); *B60L 15/2009* (2013.01); *B60L 15/2036* (2013.01); *B60W 10/08* (2013.01); *B60W 10/16* (2013.01); *B60W 30/18127* (2013.01); *F16H 48/06* (2013.01); *B60K 17/165* (2013.01); *B60K 2007/0092* (2013.01); *B60K 2023/043* (2013.01); *B60L 2220/46* (2013.01); *B60L 2240/12* (2013.01); *B60L 2240/24* (2013.01); *B60L 2240/421* (2013.01); *B60L 2240/423* (2013.01); *B60L 2240/461* (2013.01); *B60L 2240/486* (2013.01); *B60L 2260/26* (2013.01); *B60W 2540/12* (2013.01); *B60W 2710/083* (2013.01); *B60W 2720/406* (2013.01); *Y02T 10/6217* (2013.01); *Y02T 10/6243* (2013.01); *Y02T 10/6265* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01); *Y10S 903/93* (2013.01); *Y10T 477/10* (2015.01)

(56) References Cited

U.S. PATENT DOCUMENTS

2012/0118652 A1 5/2012 Yamamoto et al.
2012/0143426 A1 6/2012 Yamamoto et al.

FOREIGN PATENT DOCUMENTS

| JP | 2001-25289 | A | 1/2001 |
| JP | 3138799 | B2 | 2/2001 |
| JP | 2004-40975 | A | 2/2004 |
| JP | 2004-248498 | A | 9/2004 |
| JP | 2004-345575 | A | 12/2004 |
| JP | 2009-166723 | A | 7/2009 |
| JP | 2011-31746 | A | 2/2011 |
| WO | 2011/013829 | A1 | 2/2011 |

OTHER PUBLICATIONS

Written Opinion of the International Searching Authority dated May 14, 2013 issued in corresponding application No. PCT/JP2013/057896.
Japanese Office Action dated Jun. 3, 2014 in counterpart application JP 2014-507760.

* cited by examiner

VEHICLE DRIVING SYSTEM

TECHNICAL FIELD

The present invention relates to a vehicle driving system which includes a left wheel driving system which drives a left wheel and a right wheel driving system which drives a right wheel.

BACKGROUND ART

Patent Literature 1 describes a vehicle driving system which includes a left wheel driving system having a first motor which drives a left wheel of a vehicle and a first planetary gear type speed changer which is provided on a power transmission path between the first motor and the left wheel, and a right wheel driving system having a second motor which drives a right wheel of the vehicle and a second planetary gear type speed changer which is provided on a power transmission path between the second motor and the right wheel. In the first and second planetary gear type speed changers, the first and second motors are connected to corresponding sun gears, the left wheel and the right wheel are connected to corresponding planetary carriers, and ring gears are connected to each other. Additionally, the vehicle driving system includes brake units which control the rotation of the ring gears by releasing or applying the connected ring gears.

In the vehicle driving system configured in this way, it is described that a start assist control is performed at the time of start of the vehicle by applying the brake units. Further, it is described that with the brake units released after the start of the vehicle, a torque control is performed so that torques generated in the first and second motors act in opposite directions, whereby even though a yaw moment is exerted on the vehicle due to disturbance or the like, a moment opposing to the yaw moment is produced so as to improve the straight line stability or the turning stability.

RELATED ART REFERENCES

Patent Literature

Patent Literature 1: JP 3138799 B2

SUMMARY OF THE INVENTION

Problem that the Invention is to Solve

Incidentally, in the vehicle driving system described in Patent Literature 1, when shifting from the state where the brake units are applied to the state where the brake units are released, no specific description is made on how to control the first and second motors. When the brake units are released from the state where they are applied, there are fears that the running stability of the vehicle is worsened unless the first and second motors are controlled accurately.

The invention has been made in view of the problem described above, and an object thereof is to provide a vehicle driving system which can provide a superior running stability.

Means for Solving the Problem

In order to achieve the above-mentioned object, the first aspect of the embodiments is characterized by a vehicle driving system (e.g., a rear wheel driving system 1 in embodiment) including:

a left wheel driving system having a first motor (e.g., a first motor 2A in embodiment) which drives a left wheel (e.g., a left rear wheel LWr in embodiment) of a vehicle and a first speed changer (e.g., a first planetary type speed reducer 12A in embodiment) which is provided on a power transmission path between the first motor and the left wheel;

a right wheel driving system having a second motor (e.g., a second motor 2B in embodiment) which drives a right wheel (e.g., a right rear wheel RWr in embodiment) of the vehicle and a second speed changer (e.g., a second planetary gear type speed reducer 12B) which is provided on a power transmission path between the second motor and the right wheel; and a motor controller (e.g., a controller 8 in embodiment) which controls the first motor and the second motor, wherein:

the first and the second speed changers each has first to third rotational elements;

the first motor is connected to the first rotational element (e.g., a sun gear 21A in embodiment) of the first speed changer;

the second motor is connected to the first rotational element (e.g., a sun gear 21B in embodiment) of the second speed changer;

the left wheel is connected to the second rotational element (e.g., a planetary carrier 23A in embodiment) of the first speed changer;

the right wheel is connected to the second rotational element (e.g., a planetary carrier 23B in embodiment) of the second speed changer;

the third rotational element (e.g., a ring gear 24A in embodiment) of the first speed changer and the third rotational element (e.g., a ring gear 24B in embodiment) of the second speed changer are connected to each other;

the vehicle driving system further includes:
  a rotation restricting unit (e.g., hydraulic brakes 60A, 60B in embodiment) which can be shifted between a released state and an applied state and which restricts a rotation of the third rotational elements when shifted to the applied state; and
  a rotation restricting unit controller (e.g., the controller 8 in embodiment) which controls the rotation restricting unit; and
  when the rotation restricting unit controller shifts the rotation restricting unit from the applied state to the released state, the motor controller controls the first motor and the second motor so that a torque sum of the first motor and the second motor approaches zero while maintaining a torque difference between the first motor and the second motor.

Further, the second aspect of the embodiments is characterized in that, in addition to the configuration according to the first aspect, after the torque sum of the first motor and the second motor becomes zero, the rotation restricting unit controller shifts the rotation restricting unit to the released state.

Further, the third aspect of the embodiments is characterized in that, in addition to the configuration according to the first or second aspect, when the first motor and the second motors are controlled so that the torque sum of the first motor and the second motor approaches zero, the torque sum is controlled to gradually decrease towards zero.

Further, the fourth aspect of the embodiments is characterized in that, in addition to the configuration according to any one of the first to third aspects, when the rotation restricting unit controller shifts the rotation restricting unit to the released state, the motor controller determines a target rotation state quantity of the first motor or the second motor based on at least one of an efficiency of the motor and an efficiency of an electric power supply unit which supplies electric power to the motor.

Further, the fifth aspect of the embodiments is characterized in that, in addition to the configuration according to any one of the first to third aspects:

the first and the second speed changers each has a fourth rotational element (e.g., planetary gears 22A, 22B in embodiment) which is supported by the second rotational element to be capable of revolving and which meshes with the first rotational element and the third rotational element; and when the rotation restricting unit controller shifts the rotation restricting unit to the released state, the motor controller determines a target rotation state quantity of the first motor or the second motor based on a target rotation state quantity (e.g., a planetary gear target rotation number in embodiment) of the fourth rotational element.

Further, the sixth aspect of the embodiments is characterized in that, in addition to the configuration according to the fifth aspect, the target rotation state quantity of the fourth rotational element is set so that a rotational direction of the fourth rotational element which is rotating in one direction or the other direction is not to be reversed.

Further, the seventh aspect of the embodiments is characterized in that, in addition to the configuration according to the fifth or sixth aspect, the target rotation state quantity of the first motor or the second motor is determined further based on an actual rotation state quantity of the second rotational element or an actual rotation state quantity of the left wheel or the right wheel.

Further, the eighth aspect of the embodiments is characterized in that, in addition to the configuration according to any one of the fourth to seventh aspects:

the motor controller:

obtains the target rotation state quantity (e.g., a motor target rotation number $MA2$ in embodiment) of the first motor, an actual rotation state quantity (e.g., a motor actual rotation number $MA1$ in embodiment) of the first motor, the target rotation state quantity (e.g., a motor target rotation number $MB2$ in embodiment) of the second motor, and an actual rotation state quantity (e.g., a motor actual rotation number $MB1$ in embodiment) of the second motor;

determines a first rotation state quantity difference (e.g., a rotation number difference $DA$ in embodiment) which is a rotation state quantity difference between the target rotation state quantity of the first motor and the actual rotation state quantity of the first motor, and a second rotation state quantity difference (e.g., a rotation number difference $DB$ in embodiment) which is a rotation state quantity difference between the target rotation state quantity of the second motor and the actual rotation state quantity of the second motor;

determines a rotation state quantity control torque (e.g., a first rotation control torque $SM1$ in embodiment) based on either smaller one of the first rotation state quantity difference and the second rotation state quantity difference; and determines both a control torque (e.g., a first motor torque $M1$ in embodiment) of the first motor and a control torque (e.g., a second motor torque $M2$ in embodiment) of the second motor based on the rotation state quantity control torque.

Advantage of the Invention

According to the first aspect, when the rotation restricting unit is controlled to be shifted from the applied state to the released state, the yaw moment generated can be maintained constant during the shift of the rotation restricting unit from the applied state to the released state by maintaining the torque difference between the first motor and the second motor constant. In addition, when the rotation restricting unit is controlled to be shifted from the applied state to the released state, the change in state in the front-to-rear direction at the time of releasing the rotation restricting unit can be reduced by controlling the first motor and the second motor so that the torque sum thereof approaches zero.

According to the second aspect, the occurrence of the front-to-rear state change can be suppressed in a more ensured fashion by controlling the rotation restricting unit to the released state after the torque sum of the first motor and the second motor becomes zero.

According to the third aspect, the occurrence of a quick front-to-rear state change can be suppressed by suppressing a quick and abrupt change in torque sum of the first motor and the second motor.

According to the fourth aspect, the third rotational elements are connected to each other in the first speed changer and the second speed changer, and therefore, the first motor which is connected to the first speed changer and the second motor which is connected to the second speed changer cannot be controlled independently in complete manner. Therefore, although respective variation in rotation number is affected to each other, the first motor or the second motor can have a desired rotation state quantity without transmitting an unnecessary torque to the left and right wheels by applying torques which have equal absolute values and which act in the same direction to the first motor and the second motor. Consequently, the consumption of electric power can be reduced by determining a target rotation state quantity based on the efficiencies of the motors and/or the efficiency of the electric power supply unit. In other words, the motors are allowed to rotate at a rotation number at which the consumption of electric power becomes the least by taking the advantage that the motors can rotate at arbitrary rotation numbers.

According to the fifth aspect, the third rotational elements are connected to each other in the first speed changer and the second speed changer, and therefore, the first motor which is connected to the first speed changer and the second motor which is connected to the second speed changer cannot be controlled independently in complete manner. Therefore, although respective variation in rotation number is affected to each other, the first motor or the second motor can have a desired rotation state quantity without transmitting an unnecessary torque to the left and right wheels by applying torques which have equal absolute values and which act in the same direction to the first motor and the second motor. Consequently, the rotational state of the fourth rotational element which meshes with the first and third rotational elements can be controlled as required.

According to the sixth aspect, it is possible to prevent the occurrence of a backlash due to the reverse of the rotational direction of the fourth rotational element, thereby making it possible to prevent the disturbance in torque that is generated in the wheels by the backlash.

According the seventh aspect, the target rotation state quantity of the motor is determined based on the actual rotation state quantity of the second rotational element or the actual rotation state quantity of the wheel in addition to the target rotation state quantity of the fourth rotational element, and therefore, the rotation of the fourth rotational element can be controlled with better accuracy.

According to the eighth aspect, when there is a difference in rotation state quantity difference between the first motor and the second motor, one motor is allowed to hold the desired rotation state quantity and the other motor can be restrained from being controlled excessively by applying the rotation state quantity control torque which is determined based on the smaller rotation state quantity difference to the first and second motors.

BRIEF DESCRIPTION OF THE DRAWINGS

FIG. 10A shows a state in which the vehicle is being accelerated by the rear wheel driving system, and FIG. 10B shows a state in which the vehicle is driven for regeneration by the rear wheel driving system.

FIG. 13A is a velocity collinear diagram of the rear wheel driving system when the ring lock control is being performed, FIG. 13B is a velocity collinear diagram of the rear wheel driving system when both the ring free target torque control and the ring free target rotation number control are being performed, and FIG. 13C is a velocity collinear diagram when the ring free target torque control is being performed.

MODE FOR CARRYING OUT THE INVENTION

Firstly, referring to FIGS. 1 to 3, an embodiment of a vehicle driving system according to the invention will be described.

Figure 1:
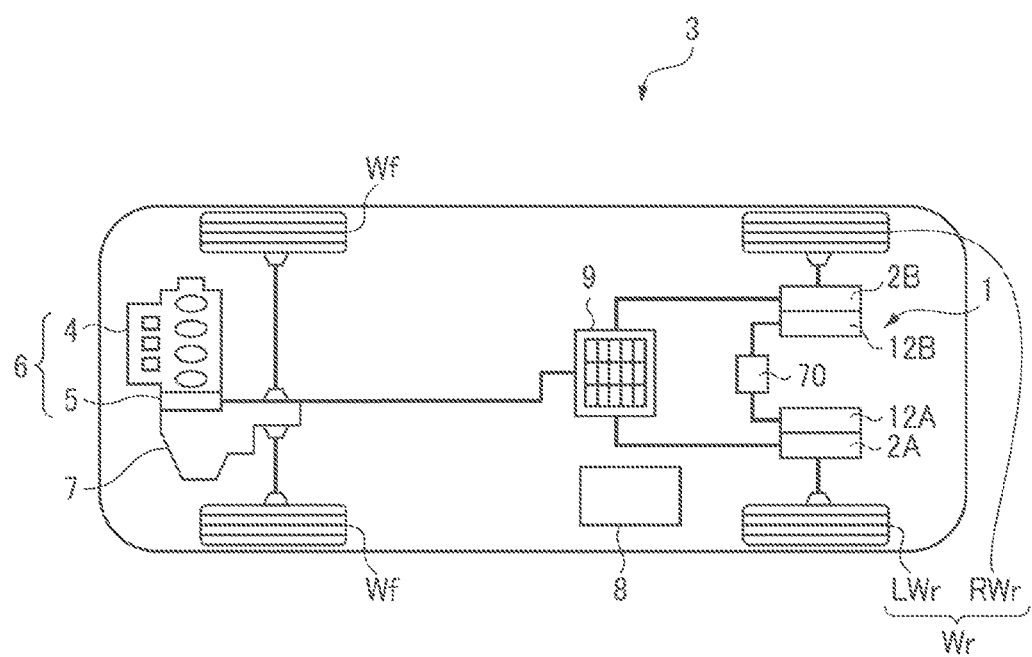
FIG. 1 is a block diagram showing a schematic configuration of a hybrid vehicle which is an embodiment of a vehicle which can install a vehicle driving system according to the invention.

The vehicle driving system according to the invention uses motors as drive sources for driving axles and is used, for example, in a driving system as shown in FIG. 1. In the following description, the vehicle driving system will be described as being applied to a rear wheel driving system, however, the vehicle driving system may be applied to a front wheel driving system.

A vehicle 3 shown in FIG. 1 is a hybrid vehicle having a driving system 6 (hereinafter, referred to as a front wheel driving system) in which an internal combustion engine 4 and a motor 5 are connected in series at a front portion of the vehicle. Power of this front wheel driving system 6 is transmitted to front wheels Wf via a speed changer 7, while power of a driving system 1 (hereinafter, referred to as a rear wheel driving system) which is provided at a rear portion of the vehicle separately from the front wheel driving system 6 is transmitted to rear wheels Wr (RWr, LWr). The motor 5 of the front wheel driving system 6 and first and second motors 2A, 2B of the rear wheel driving system 1 for the rear wheels Wr are connected to a battery 9 so that electric power is supplied thereto from the battery 9 and energy is recovered therein to be stored in the battery 9. Reference numeral 8 denotes a controller which executes various controls of the whole of the vehicle.

Figure 2:
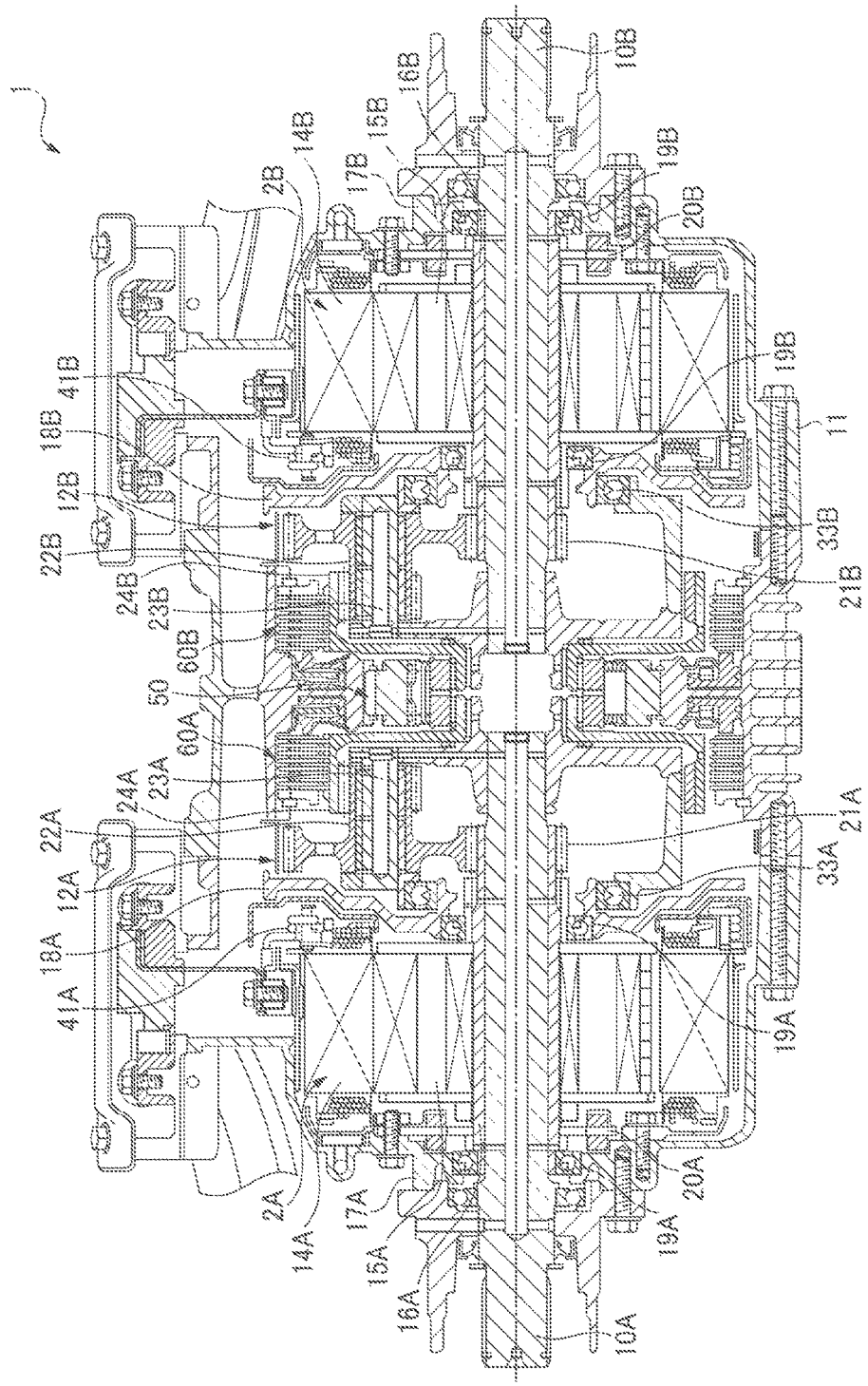
FIG. 2 is a vertical sectional view of an embodiment of a rear wheel driving system.
Figure 3:
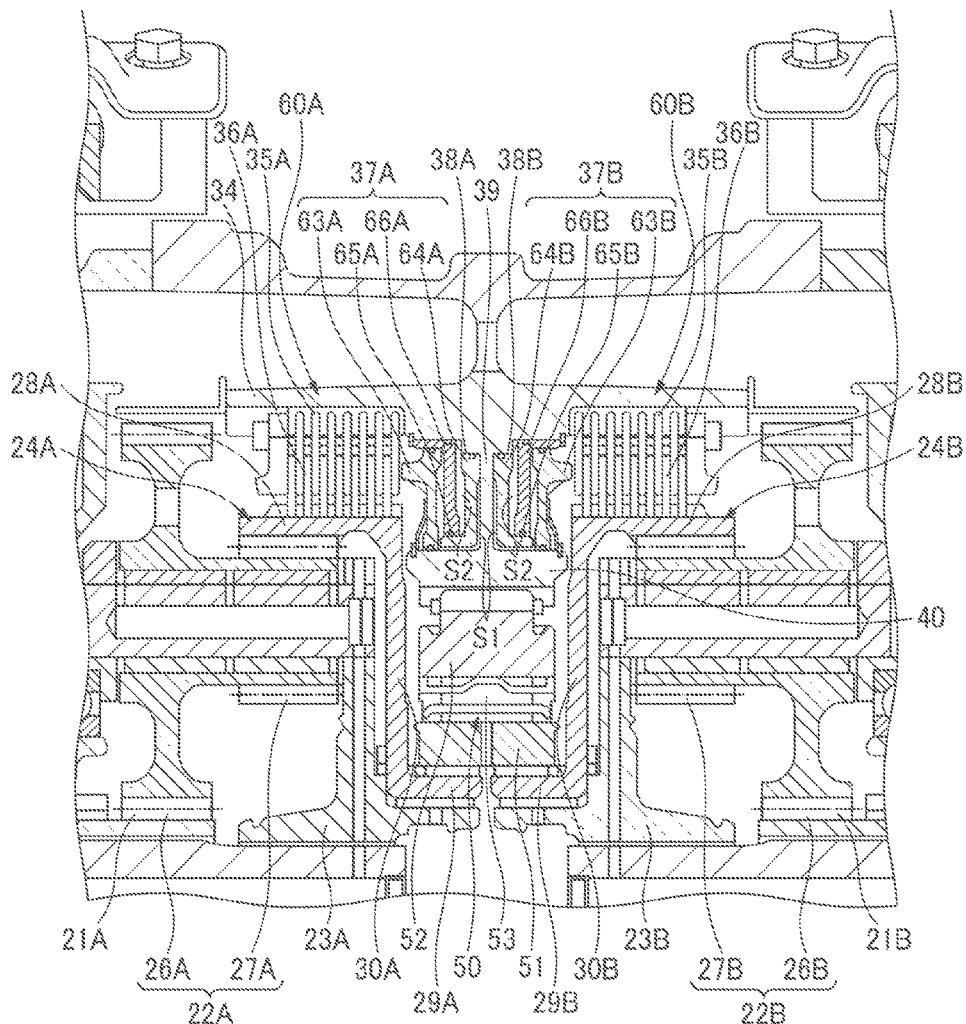
FIG. 3 is a partial enlarged view of the rear wheel driving system shown in FIG. 2.

FIG. 2 is a vertical sectional view of the whole of the rear wheel driving system 1. In the same FIG. 10A, 10B denote left and right axles of the rear wheels Wr of the vehicle 3, which are disposed coaxially in a transverse direction of the vehicle. A speed reducer case 11 of the rear wheel driving system 1 is formed into a substantially cylindrical shape as a whole, and the first and second motors 2A, 2B for axle driving and a first and second planetary gear type speed reducers 12A, 12B which decelerate the driving rotations of the first and second motors 2A, 2B are disposed coaxially with the axles 10A, 10B in an interior of the speed reducer case 11. The first motor 2A and the first planetary type speed reducer 12A function as a left wheel driving system which drives the left rear wheel LWr, and the second motor 2B and the second planetary gear type speed reducer 12B function as a right wheel driving system which drives the right rear wheel RWr. The first motor 2A and the first planetary gear type speed reducer 12A, and the second motor 2B and the second planetary type speed reducer 12B are disposed laterally symmetrical in the transverse direction of the vehicle within the speed reducer case 11.

Stators 14A, 14B of the first and second motors 2A, 2B are fixed to left and right end portions of the interior of the speed reducer case 11, and annular rotors 15A, 15B are disposed rotatably on inner circumferential sides of the stators 14A, 14B. Cylindrical shafts 16A, 16B which surround outer circumferences of the axles 10A, 10B are connected to inner circumferential portions of the rotors 15A, 15B. These cylindrical shafts 16A, 16B are supported in end walls 17A, 17B and middle walls 18A, 18B via bearings 19A, 19B so as to rotate relatively to and concentrically with the axles 10A, 10B. Resolvers 20A, 20B are provided on outer circumferences of end portions of the cylindrical shafts 16A, 16B on the end walls 17A, 17B of the speed reducer case 11, the resolvers 20A, 20B being configured to feed back information on the rotational positions of the rotors 15A, 15B to controllers (not shown) for controlling the first and second motors 2A, 2B.

The first and second planetary gear type speed reducers 12A, 12B include sun gears 21A, 21B, plural planetary gears 22A, 22B which mesh with the sun gears 21A, 21B, planetary carriers 23A, 23B which support the planetary gears 22A, 22B and ring gears 24A, 24B which mesh with outer circumferential sides of the planetary gears 22A, 22B. Driving forces of the first and second motors 2A, 2B are inputted from the sun gears 21A, 21B, and the driving forces are decelerated to be outputted through the planetary carriers 23A, 23B.

The sun gears 21A, 21B are formed integrally with the cylindrical shafts 16A, 16B. As shown in FIG. 3, for example, the planetary gears 22A, 22B are double pinions having first pinions 26A, 26B having a large diameter which mesh directly with the sun gears 21A, 21B and second pinions 27A, 27B which are smaller in diameter than the first pinions 26A, 26B. The first pinions 26A, 26B and the second pinions 27A, 27B are formed integrally in such a state that the first pinions 26A, 26B and the second pinions 27A, 27B are concentric and are offset axially. The planetary gears 22A, 22B are supported by the planetary carriers 23A, 23B. Axial inner end portions of the planetary carriers 23A, 23B extend radially inwards to be spline fitted on the axles 10A, 10B so as to be supported thereon in such a way as to rotate together with the axles 10A, 10B. The planetary carriers 23A, 23B are also supported on the middle walls 18A, 18B via bearings 33A, 33B.

The middle walls 18A, 18B isolate motor accommodation spaces where the first and second motors 2A, 2B are accommodated from speed reducer accommodation spaces where the first and second planetary gear type speed reducers 12A, 12B are accommodated and are bent from a radially outer side to a radially inner side so as to expand an axial space therebetween. The bearings 33A, 33B which support the planetary carriers 23A, 23B are disposed at the radially inner sides of the middle walls 18A, 18B and on sides of the middle walls 18A, 18B which face the first and second planetary gear type speed reducers 12A, 12B. Bus rings 41A, 41B for the stators 14A, 14B are disposed at the radially outer sides of the middle walls 18A, 18B and on sides of the middle walls 18A, 18B which face the first and second motors 2A, 2B (refer to FIG. 2).

The ring gears 24A, 24B include gear portions 28A, 28B which mesh with the second pinions 27A, 27B, which are smaller in diameter, on inner circumferential surfaces thereof, small-diameter portions 29A, 29B which are smaller in diameter than the gear portions 28A, 28B and which are disposed opposite to each other in a middle position of the speed reducer case 11, and connecting portions 30A, 30B which connect together axial inner end portions of the gear portions 28A, 28B and axial outer end portions of the small-diameter portions 29A, 29B in a radial direction. In the case of this embodiment, a largest radius of the ring gears 24A, 24B is set so as to be smaller than a largest distance of the first pinions 26A, 26B from centers of the axles 10A, 10B. The small-diameter portions 29A, 29B both spline fit in inner races 51 of a one-way clutch 30, so that the ring gears 24A, 24B rotate together with the inner races 51 of the one-way clutch 50.

Incidentally, a cylindrical space portion is defined between the speed reducer case 11 and the ring gears 24A, 24B, and hydraulic brakes 60A, 60B, which constitutes brake units for the ring gears 24A, 24B, are disposed within the space portion so as to overlap the first pinions 26A, 26B in the radial direction and the second pinions 27A, 27B in the axial direction. In the hydraulic brakes 60A, 60B, plural fixed plates 35A, 35B which are spline fitted in an inner circumferential surface of a cylindrical radially outer support portion 34 which extends in the axial direction on a radially inner side of the speed reducer case 11 and plural rotational plates 36A, 36B which are spline fitted on outer circumferential surfaces of the ring gears 24A, 24B are disposed alternately in the axial direction. Then, these plates 35A, 35B, 36A, 36B are operated to be applied and released by annular pistons 37A, 37B. The pistons 37A, 37B are accommodated so as to move forwards and backwards within annular cylinder chambers 38A, 38B which are defined between a laterally dividing wall 39 which extends radially inwards from the middle position of the speed reducer case 11 and the radially outer support portion 34 and a radially inner support portion 40 which are connected by the laterally dividing wall 39. The pistons 37A, 37B are caused to move forwards by introducing highly-pressurized oil into the cylinder chambers 38A, 38B and are caused to move backwards by discharging the highly-pressurized oil from the cylinder chambers 38A, 38B. The hydraulic brakes 60A, 60B are connected to an electric oil pump 70 (refer to FIG. 1).

More specifically, the pistons 37A, 37B have first piston walls 63A, 63B and second piston walls 64A, 64B which are aligned sequentially in the axial direction, and these piston walls 63A, 63B, 64A, 64B are connected together by cylindrical inner circumferential walls 65A, 65B. Consequently, annular spaces which are opened radially outwards are defined between the first piston walls 63A, 63B and the second piston walls 64A, 64B, and the annular spaces are divided laterally in the axial direction by partition members 66A, 66B which are fixed to inner circumferential surfaces of outer walls of the cylinder chambers 38A, 38B. Spaces defined between the laterally dividing wall 39 of the speed reducer case 11 and the second piston walls 64A, 64B are made into first working chambers S1 into which the highly-pressurized oil is introduced directly. Spaces defined between the partition members 66A, 66B and the first piston walls 63A, 63B are made into second working chambers S2 which communicate with the first working chambers S1 via through holes formed in the inner circumferential walls 65A, 65B. Spaces defined between the second piston walls 64A, 64B and the partition members 66A, 66B communicate with the atmosphere.

In the hydraulic brakes 60A, 60B, oil is introduced into the first working chambers S1 and the second working chambers S2 from a hydraulic circuit, not shown, whereby the fixed plates 35A, 35B and the rotational plates 36A, 36B are pressed against each other by virtue the pressure of the oil which acts on the first piston walls 63A, 63B and the second piston walls 64A, 64B. Consequently, a large pressure bearing surface area can be gained by the first and second piston walls 63A, 63B, 64A, 64B which are aligned sequentially in the axial direction, and therefore, it is possible to obtain a large pressing force for the fixed plates 35A, 35B and the rotational plates 36A, 36B while suppressing the radial surface areas of the pistons 37A, 37B.

In the case of the hydraulic brakes 60A, 60B, the fixed plates 35A, 35B are supported on the radially outer support portion 34 which extends from the speed reducer case 11, while the rotational plates 36A, 36B are supported on the ring gears 24A, 24B. Therefore, when both the plates 35A, 35B and the plates 36A, 36B are pressed against each other by the pistons 37A, 37B, both the plates 35A, 35B and the plates 36A, 36B are frictionally fastened together, and a braking force acts on the ring gears 24A, 24B, whereby the ring gears 24A, 24B are fixed (locked). Then, when the frictionally fastened state of the plates by the pistons 37A, 37B is released from that state, the ring gears 24A, 24B are permitted to rotate freely.

Namely, the hydraulic brakes 60A, 60B function as rotation restricting unit which restrict the rotation of the ring gears 24A, 24B. When applied, the hydraulic brakes 60A, 60B lock the ring gears 24A, 24B to thereby establish connections between the first and second motors 2A, 2B and the rear wheels Wr through power transmission paths so that power can be transmitted to the rear wheels Wr, while when released, the hydraulic brakes 60A, 60B permit the rotation of the ring gears 24A, 24B to thereby cut off the connections between the first and second motors 2A, 2B and the rear wheels Wr through the power transmission paths so that the power cannot be transmitted to the rear wheels Wr.

Additionally, a space portion is ensured between the connecting portions 30A, 30B of the ring gears 24A, 24B that face oppositely each other in the axial direction, and the one-way clutch 50 is disposed within the space portion, the one-way clutch 50 being configured to transmit power to the ring gears 24A, 24B only in one direction and cut off power that is attempted to be transmitted, in the other direction. The one-way clutch 50 is such that a large number of sprags 53 are interposed between the inner races 51 and the outer race 52, and the inner races 51 spline fit on the small-diameter portions 29A, 29B of the ring gears 24A, 24B so as to rotate together therewith. Namely, the ring gear 24A and the ring gear 24B are connected to each other by the inner races 51 so as to rotate together. The outer race 52 is positioned and restricted from rotation by the radially inner support portion 40.

The one-way clutch 50 is engaged to lock the rotation of the ring gears 24A, 24B when the vehicle 3 travels forwards with the power of the first and second motors 2A, 2B. To describe this more specifically, the one-way clutch 50 is engaged when torques in a forward direction (a rotational direction when the vehicle 3 is caused to travel forwards) of the first and second motors 2A, 2B are inputted into the rear wheels Wr, white the one-way clutch 50 is disengaged when torques in a reverse direction of the first and second motors 2A, 2B are inputted into the rear wheels Wr. Additionally, the one-way clutch 50 is disengaged when torques in the forward direction of the rear wheels Wr are inputted into the first and second motors 2A, 2B, while the one-way clutch 50 is engaged when torques in the reverse direction of the rear wheels Wr are inputted into the first and second motors 2A, 2B. In other words, when it is disengaged, the one-way clutch 50 permits the rotation of the ring gears 24A, 24B in one direction by the torques in the reverse direction of the first and second motors 2A, 2B, while when it is engaged, the one-way clutch 50 restricts the rotation of the ring gears 24A, 24B in the reverse direction by the torques in the forward direction of the first and second motors 2A, 2B. The torques in the reverse direction denote a torque which acts in a direction to increase the rotation of the ling gears 24A, 24B in the reverse direction or a torque which acts in a direction to decrease the rotation of the ring gears 24A, 24B in the forward direction.

In this way, in the rear wheel driving system 1 of this embodiment, the one-way clutch 50 and the hydraulic brakes 60A, 60B are provided in parallel on the power transmission paths between the first and second motors 2A, 2B and the rear wheels Wr. It is noted that the two hydraulic brakes 60A, 60B do not have to be provided, and hence, a hydraulic brake is provided only in one of the spaces, and the other space may be used as a breather chamber.

Here, the controller 8 (refer to FIG. 1) is a controller which executes various controls in relation to the whole of the vehicle. Values read by wheel speed sensors, values read by motor rotation number sensors of the first and second motors 2A, 2B, a steering angle, an accelerator position AP, a shift position, a state of charge SOC of the battery 9, an oil temperature and the like are inputted into the controller 8. On the other hand, a signal which controls the internal combustion engine 4, signals which controls the first and second motors 2A, 2B, a control signal which controls the electric oil pump 70 and the like are outputted from the controller 8.

Namely, the controller 8 includes at least a function as a motor controller which controls the first and second motors 2A, 2B and a function as a rotation restricting unit controller which controls the hydraulic brakes 60A, 60B which function as the rotation restricting unit.

FIGS. 4 to 13C show velocity collinear diagrams of several states of the rear wheel driving system 1, and in the figures, LMOT represents the first motor 2A, and RMOT represents the second motor 2B. S, C, PG on a left-hand side (only in FIGS. 12, and 13A to 13C) represent the sun gear 21A of the first planetary gear type speed reducer 12A which is connected to the first motor 2A, the planetary carrier 23A of the first planetary gear type speed reducer 12A, and the planetary gear 22B of the second planetary gear type speed reducer 12B, respectively. S, C, PG on a right-hand side (only in FIGS. 12, and 13A to 13C) represent the sun gear 21B of the second planetary gear type speed reducer 12B, the planetary carrier 23B of the second planetary gear type speed reducer 12B, and the planetary gear 22A of the first planetary gear type speed reducer 12A, respectively. R represents the ring gears 24A, 24B of the first and second planetary gear type speed reducers 12A, 12B, BRK represents the hydraulic brakes 60A, 60B, and OWC represents the one-way clutch 50. In the following description, a rotational direction of the sun gears 21A, 21B when the vehicle is driven forwards by the first and second motors 2A, 2B is referred to as the forward direction. Additionally, in the figures, a portion above a line denoting a state in which the vehicle is stopped denotes a forward rotation, whereas a portion below the line denotes a backward rotation. Arrows directed upwards denote forward torque, whereas arrows directed downwards denote backward torque.

Figure 4:
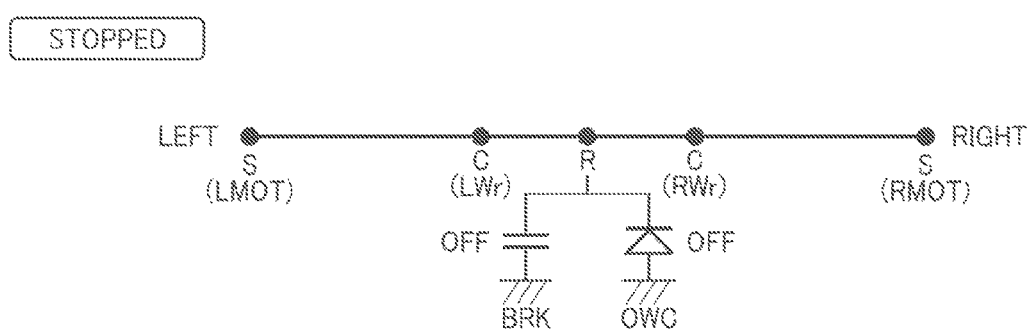
FIG. 4 is a velocity collinear diagram of the rear wheel driving system while the vehicle is stopped.

While the vehicle is stopped, neither the front wheel driving system 6 nor the rear wheel driving system 1 is driven. Consequently, as shown in FIG. 4, the first and second motors 2A, 2B of the rear wheel driving system 1 are stopped, and hence, the axles 10A, 10B are also stopped. Therefore, no torque acts on any one of the constituent elements. In this state, the hydraulic brakes 60A, 60B are released (OFF). Additionally, since the motors 2A, 2B are not driven, the one-way clutch 50 is not engaged (OFF).

Figure 5:
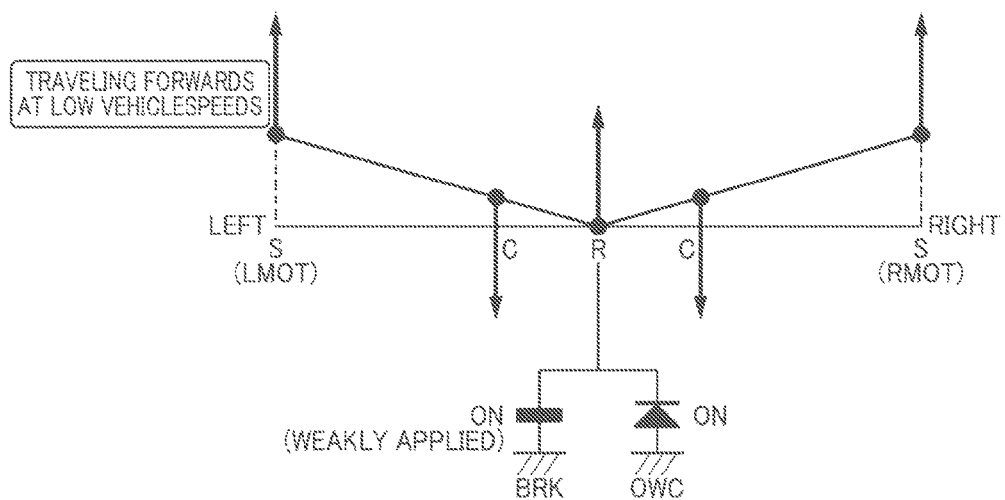
FIG. 5 is a velocity collinear diagram of the rear wheel driving system while the vehicle is traveling forwards at low vehicle speeds.

Then, while the vehicle is traveling forwards at low vehicle speeds by EV start and EV cruise with good motor efficiency after an ignition key is placed in an ON position, the vehicle is driven based on a rear-wheel drive by the rear wheel driving system 1. As shown in FIG. 5, when the first and second motors 2A, 2B are driven to rotate in the forward direction for power running, forward torques are applied to the sun gears 21A, 21B. At that time, as has been described before, the one-way clutch 50 is engaged, and the ring gears 24A, 24B are locked. This causes the planetary carriers 23A, 23B to rotate in the forward direction, whereby the vehicle 3 travels forwards. It is noted that running resistance acts on the planetary carriers 23A, 23B from the axles 10A, 10B in the reverse direction. In this way, when the vehicle is started, the ignition is switched on and the torque of the motors 2A, 2B is increased, whereby the one-way clutch 50 is engaged mechanically, and the ring gears 24A, 24B are locked.

At that time, the hydraulic brakes 60A, 60B are controlled to be a weakly applied state. Here, the weakly applied means a state in which the hydraulic brakes 60A, 60B are applied with an application force that is weaker than an application force of an applied state with which the hydraulic brakes 60A, 60B are applied properly, although the power transmission is enabled. The one-way clutch 50 is engaged when the forward torques of the first and second motors 2A, 2B are inputted into the rear wheels Wr, and the power can be transmitted only by the one-way clutch 50. However, by keeping the hydraulic brakes 60A, 60B in the weakly applied state and also keeping the motors 2A, 2B and the wheels Wr in the connected state, even when the input of the forward rotational power from the motors 2A, 2B is temporarily decreased, thereby putting the one-way clutch 50 in a disengaged state, it is possible to restrain the power transmission between the motors 2A, 2B and the wheels Wr from being interrupted.

Figure 6:
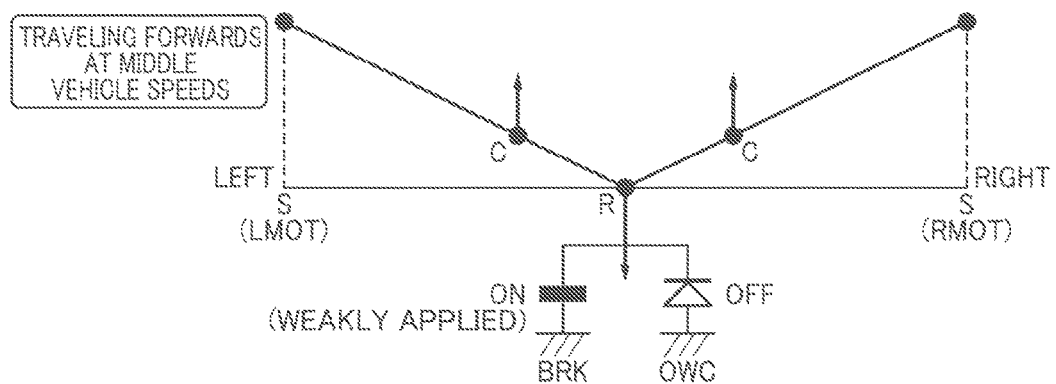
FIG. 6 is a velocity collinear diagram of the rear wheel driving system while the vehicle is traveling forwards at middle vehicle speeds.

When the vehicle 3 comes to be driven forwards at middle vehicle speeds with good engine efficiency as a result of the vehicle speed increasing from the forward driving at low vehicle speeds, the driving of the vehicle 3 is shifted from the rear-wheel drive by the rear wheel driving system 1 to a front-wheel drive by the front wheel driving system 6. As shown in FIG. 6, when the driving of the first and second motors 2A, 2B for power running is stopped, the toward torques which attempt to drive the vehicle 3 forwards are applied to the planetary carriers 23A, 23B from the axles 10A, 10B, whereby the one-way clutch 50 is disengaged as has been described before. At that time, too, the hydraulic brakes 60A, 60B are controlled to be the weakly applied state.

Figure 7:
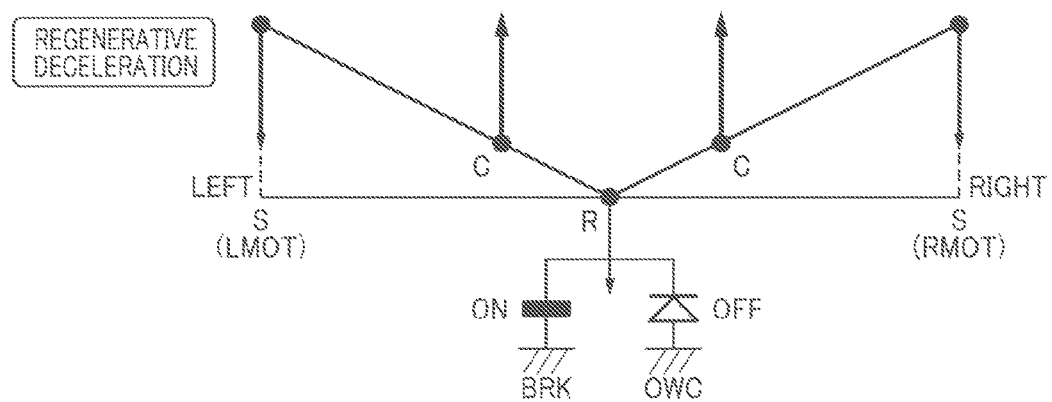
FIG. 7 is a velocity collinear diagram of the rear wheel driving system while the vehicle is being decelerated for regeneration.

When the first and second motors 2A, 2B are attempted to be driven for regeneration from the state shown in FIG. 5 or 6, as shown in FIG. 7, the forward torques which attempt to keep the vehicle 3 traveling forwards are applied to the planetary carriers 23A, 23B from the axles 10A, 10B, whereby the one-way clutch 50 is disengaged as has been described before. At that time, the hydraulic brakes 60A, 60B are controlled to be the applied state (ON). Consequently, the ring gears 24A, 24B are locked, and regenerative braking torques acting in the reverse direction are applied to the first and second motors 2A, 2B, whereby a regenerative deceleration is performed at the first and second motors 2A, 2B. In this way, the one-way clutch 50 is disengaged when the forward torques of the rear wheels Wr are inputted into the first and second motors 2A, 2B, and hence, the power cannot be transmitted only by the one-way clutch 50. However, the hydraulic brakes 60A, 60B, which are provided in parallel to the one-way clutch 50, are applied to hold the connection between the first and second motors 2A, 2B and the rear wheels Wr, whereby the power can be kept transmitted to the rear wheels Wr. By controlling the first and second motors 2A, 2B to be driven for regeneration in this state, the energy of the vehicle 3 can be regenerated.

When the vehicle 3 travels forwards at high vehicle speeds, the vehicle 3 continues to be driven based on the front-wheel drive by the front wheel driving system 6 from the forward traveling at middle vehicle speeds, and at that time, the first and second motors 2A, 2B are stopped, and the hydraulic brakes 60A, 60B are controlled to be a released state. The one-way clutch 50 is disengaged since the forward torques of the rear wheels Wr are inputted into the first and second motors 2A, 2B. Thus, the ring gears 24A, 24B start rotating by controlling the hydraulic brakes 60A, 60B to be the released state.

Figure 8:
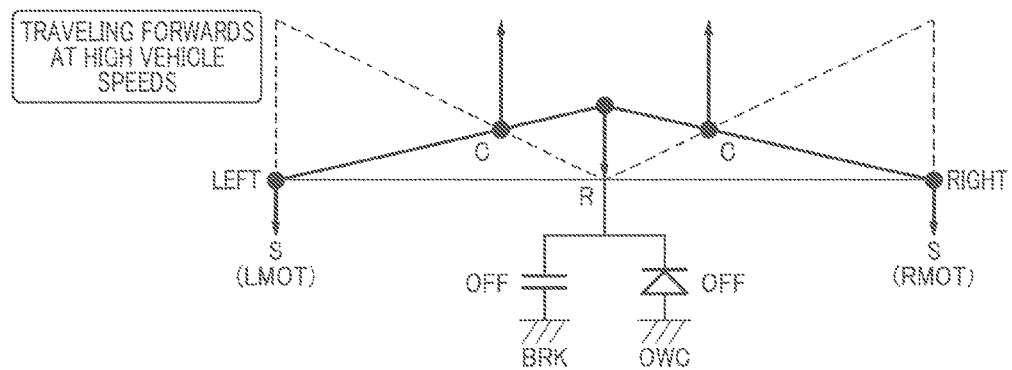
FIG. 8 is a velocity collinear diagram of the rear wheel driving system while the vehicle is traveling forwards at high vehicle speeds.

As shown in FIG. 8, when the driving of the first and second motors 2A, 2B for power running is stopped, the forward torques which attempt to cause the vehicle 3 to travel forwards are applied to the planetary carriers 23A, 23B from the axles 10A, 10B, whereby the one-way clutch 50 is disengaged as has been described before. At that time, rotation losses of the sun gears 21A, 21B and the first and second motors 2A, 2B are inputted into the sun gears 21A, 21B as resistance, and rotation losses of the ring gears 24A, 24B are generated in the ring gears 24A, 24B.

The ring gears 24A, 24B are permitted to rotate freely (hereinafter, referred to as a ring free state) by controlling the hydraulic brakes 60A, 60B to be the released state, and the connection between the first and second motors 2A, 2B and the rear wheels Wr is cut off, whereby no power can be transmitted to the rear wheels Wr. Consequently, the first and second motors 2A, 2B are prevented from being forced to rotate by the rear wheels Wr in an associated fashion. This prevents the excessive rotation of the first and second motors 2A, 2B when the vehicle is driven at high vehicle speeds by the front wheel driving system 6. In the above description, the first and second motors 2A, 2B are stopped when the ring gears 24A, 24B are in the ring free state. However, the first and second motors 2A, 2B may be driven in the ring free state (hereinafter, referred to simply as a ring free control). The ring free control will be described later.

Figure 9:
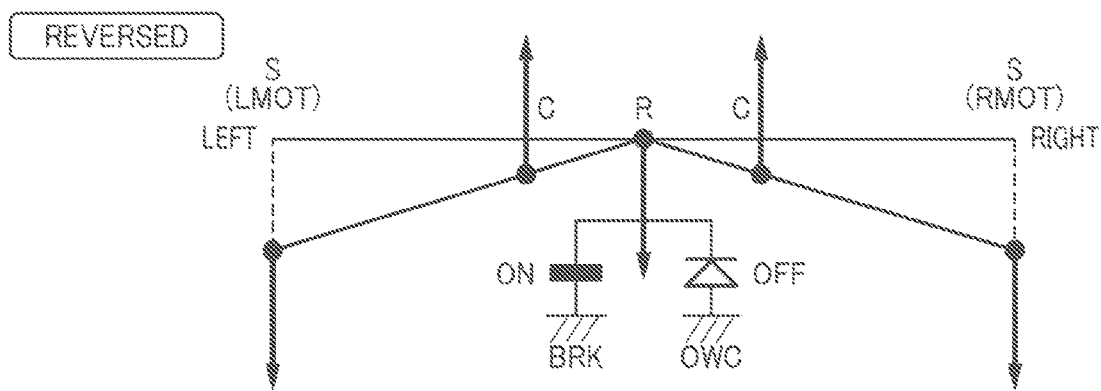
FIG. 9 is a velocity collinear diagram of the rear wheel driving system while the vehicle is being reversed.

When the vehicle 3 is reversed, as shown in FIG. 9, the first and second motors 2A, 2B are driven for power running in the reverse direction, whereby reverse torques are applied to the sun gears 21A, 21B. At that time, the one-way clutch 50 is disengaged as has been described before.

At that time, the hydraulic brakes 60A, 60B are controlled to be the applied state. Consequently, the ring gears 24A, 24B are locked, and the planetary carriers 23A, 23B rotate in the reverse direction, whereby the vehicle 3 is driven in the reverse direction. It is noted that the running resistance in the forward direction is applied to the planetary carriers 23A, 23B from the axles 10A, 10B. In this way, the one-way clutch 50 is disengaged when the reverse torques of the first and second motors 2A, 2B are inputted into the rear wheels Wr. Thus, the power cannot be transmitted only by the one-way clutch 50. However, the hydraulic brakes 60A, 60B, which are provided in parallel to the one-way clutch 50, are applied to hold the connection between the first and second motors 2A, 2B and the rear wheels Wr, whereby the power can still be transmitted to the rear wheels Wr, thereby making it possible to reverse the vehicle 3 by the torques of the first and second motors 2A, 2B.

Figure 10A:
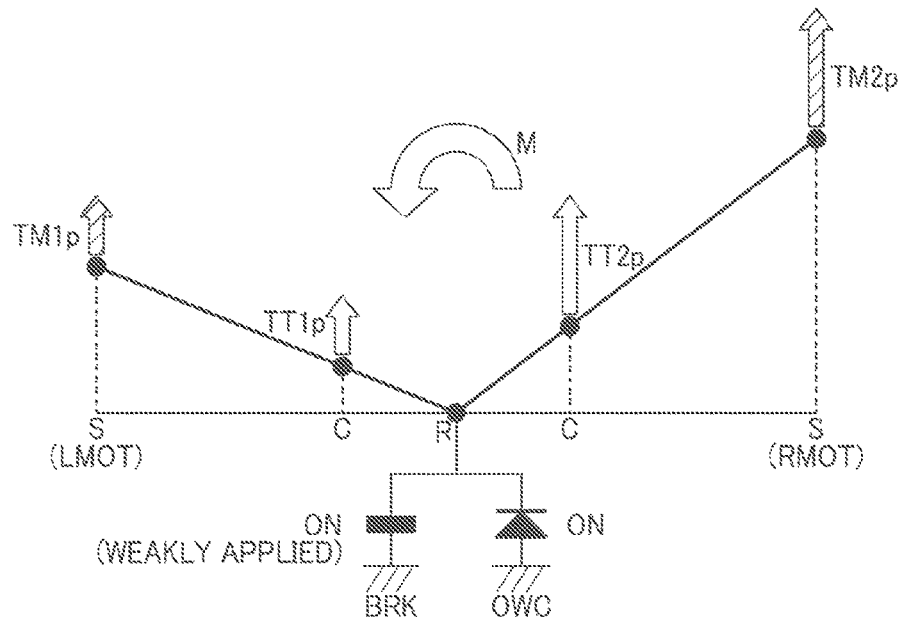
FIGS. 10A and 10B are velocity collinear diagrams of the rear wheel driving system when a ring lock control is performed.
Figure 10B:
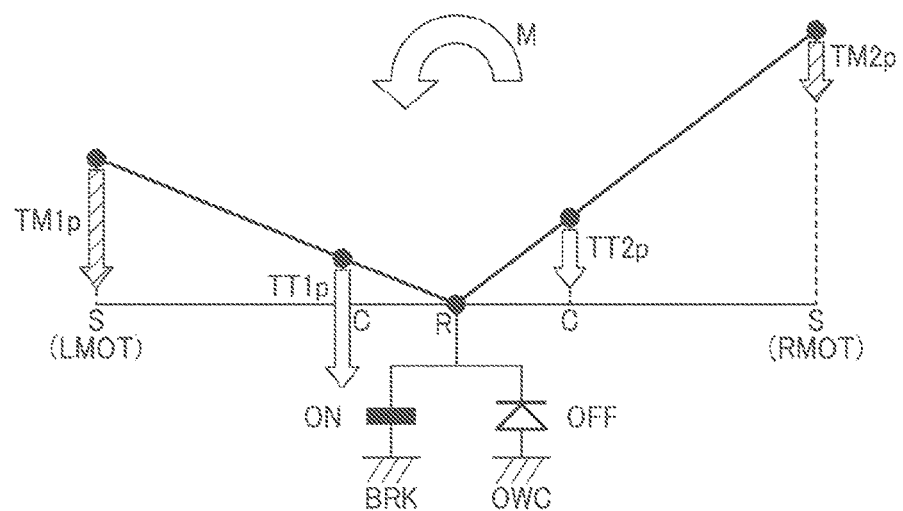

In the explanation made by reference to FIGS. 5 to 9, the vehicle is described as traveling straight ahead without a rotation number difference between the left rear wheel LWr and the right rear wheel RWr, in other words, without a rotation number difference between the planetary carrier 23A and the planetary carrier 23B. FIGS. 10A and 10B show velocity collinear diagrams when the vehicle is turning with a rotation number difference between the left rear wheel LWr and the right rear wheel RWr, in other words, with a rotation number difference between the planetary carrier 23A and the planetary carrier 23B.

FIGS. 10A and 10B show a case where the vehicle is taking a left turn in which the rotation number of the right rear wheel RWr (the planetary carrier 23B) is higher than the rotation number of the left rear wheel LWr (the planetary carrier 23A). In the following description, a control made when the vehicle is taking a turn will be described based on the case where the vehicle is taking a left turn, however, a similar control can be made when the vehicle is taking a right turn. Additionally, in FIGS. 10A to 13C, left and right rear wheel torques which are not described in FIGS. 5 to 9 are also shown, and these left and right rear wheel torques are caused to act on the left and right rear wheels LWr, RWr (the planetary carriers 23A, 23B) by the torques of the first and second motors 2A, 2B.

Further, in the following explanation, in contrast with the ring free control which is the control made when the ring gears 24A, 24B are released as a result of the one-way clutch 50 being disengaged and the hydraulic brakes 60A, 60B being released, a driving control of the first and second motors 2A, 2B made in the state where the transmission of power is enabled with the connection established between the first and second motors 2A, 2B and the rear wheels Wr as a result of the ring gears 24A, 24B are restricted from rotating freely (hereinafter, referred to as a ring lock state) by the one-way clutch 50 which is engaged and/or the hydraulic brakes 60A, 60B which are controlled to be the applied state or weakly applied state is also called a ring lock control.

<<Ring Lock Control>>

The ring lock control is the driving control of the first and second motors 2A, 2B in the ring lock state and enables target torques to be generated in the first and second motors 2A, 2B to satisfy a torque request for torque in the front-to-rear direction (hereinafter, also referred to as a target acceleration/deceleration torque) and a torque request for torque in a turning direction (hereinafter, also referred to as a target yaw moment).

The ring lock control will be described specifically by taking a control made when the vehicle is taking a left turn as an example. As shown in FIG. 10A, by executing a torque control on the first motor 2A so that a forward first motor base torque TM1p is generated therein, the forward first motor base torque TM1p acts on the sun gear 21A. At that time, since the ring gears 24A, 24B are restricted from rotating freely, in the first planetary gear type speed reducer 12A, as a result of the forward first motor base torque TM1p acting on the sun gear 21A which functions as a force point, with the ring gears 24A, 24B functioning as a support point, a forward left rear wheel torque TT1p which results from multiplying the first motor base torque TM1p by the reduction gear ratio of the first planetary gear type speed reducer 12A acts on the planetary carrier 23A which functions as a action point as a first motor base torque distribution force.

On the other hand, by also executing a torque control on the second motor 2B so that a forward second motor base torque TM2p which is larger than the first motor base torque TM1p is generated therein, the forward second motor base torque TM2p acts on the sun gear 21B. At that time, since the ring gears 24A, 24B are restricted from rotating freely, in the second planetary gear type speed reducer 12B, as a result of the forward second motor base torque TM2p acting on the sun gear 21B which functions as a force point, a forward right rear wheel torque TT2p which results from multiplying the second motor base torque TM2p by the reduction gear ratio of the second planetary gear type speed reducer 12B acts on the planetary carrier 23B which functions as a action point as a second motor base torque distribution force.

A calculation method of the first and second motor base torques TM1p, TM2p in the ring lock control will be described by the use of mathematical expressions. When letting a target torque of the left rear wheel LWr be WTT1, a target torque of the right rear wheel RWr be WTT2, a total target torque (a sum of left rear wheel torque and right rear wheel torque) of the left and right rear wheels LWr, RWr be TRT, and a target torque difference between the left and right rear wheels LWr, RWr (a difference between left rear wheel torque and right rear wheel torque) be ΔTT, the following equation (1) is established in relation to the total target torque of the left and right rear wheels LWr, RWr and the following equations (2) is established in relation to the target torque difference between the left and right rear wheels LWr, RWr.

$$WTT1+WTT2=TRT \quad (1)$$

$$WTT1-WTT2=\Delta TT \quad (2)$$

When letting a target yaw moment (a clockwise yaw moment is referred to as a positive one) be YMT, a radius of the wheel be r, and a tread (a transverse distance between the left and right rear wheels LWr, RWr) be Tr, ΔTT is expressed by the following equation (3).

$$\Delta TT=2\cdot r\cdot YMT/Tr \quad (3)$$

Consequently, the target torques TT1, TT2 of the left and right rear wheels LWr, RWr are determined unambiguously from the equations (1), (2) above.

In addition, when letting a target torque of the first motor 2A which is connected to the left rear wheel LWr be TTM1 and a target torque of the second motor 2B which is connected to the right rear wheel RWr be TTM2, the target torques TTM1, TTM2 of the left first and right second motors 2A, 2B are calculated from the following equations (4), (5).

$$TTM1=(1/\text{Ratio})\cdot WTT1 \quad (4)$$

$$TTM2=(1/\text{Ratio})\cdot WTT2 \quad (5)$$

where Ratio denotes the reduction gear ratios of the first and second planetary gear type speed reducers 12A, 12B.

The first and second motor base torque TM1p, TM2p can be obtained from the target torques TM1, TM2 of the first and second motors 2A, 2B which are determined in the way described above.

Although the reduction gear ratios of the first and second planetary gear type speed reducers 12A, 12B are equal, since the second motor base torque TM2p is larger than the first motor base torque TM1p, the right rear wheel torque TT2p is larger than the left rear wheel torque TT1p, and due to this, a counterclockwise yaw moment M which corresponds a torque difference (TT1p−TT2p) between the left and right rear wheel torques TT1p, TT2p is generated in the vehicle 3 in a stable fashion. Further, an acceleration torque which corresponds to a torque sum (TT1p+TT2p) of the left and right rear wheel torques TT1p, TT2p is generated in the vehicle 3.

In this way, in the ring lock control, the target acceleration/deceleration torque and the target yaw moment can be satisfied in relation to the total target torque of the left and right rear wheels LWr, RWr and the target torque difference between the left and right rear wheels LWr, RWr.

In FIG. 10A, although the torque sum (TT1p+TT2p) of the left and right rear wheel torques TT1p, TT2p is described as being positive, in order to generate a counterclockwise yaw moment M having the same magnitude as that of the yaw moment M in FIG. 10A, as shown in FIG. 10B, a torque control may be performed on the first motor 2A so that a reverse first motor base torque TM1p is generated therein.

Also, a torque control may be performed on the second motor 2B so that a reverse second motor base torque TM2$p$ which is smaller than the first motor base torque TMp1 is generated therein. This enables a counterclockwise yaw moment M which corresponds to the torque difference (TT1$p$−TT2$p$) between the left and right rear wheel torques TT1$p$, TT2$p$ to be generated in the vehicle 3 in a stable fashion. In this case, since the torque sum (TT1$p$+TT2$p$) of the left and right rear wheel torques TT1$p$, TT2$p$ is negative, a (regenerative) deceleration torque which corresponds to the torque sum (TT1$p$+TT2$p$) of the left and right rear wheel torques TT1$p$, TT2$p$ is generated in the vehicle 3. In FIG. 10B, since the reverse torques of the first and second motors 2A, 2B are inputted into the rear wheels Wr, the one-way clutch 50 is disengaged, and the hydraulic brakes 60A, 60B are controlled to be the applied state.

The hydraulic brakes 60A, 60B are released to prevent the excessive rotation of the first and second motors 2A, 2B when the vehicle speed exceeds a certain threshold while turning to reach a forward traveling at high vehicle speeds. At that time, the control is shifted from the ring lock control to the ring free control.

<<Ring Free Control>>

The ring free control is a driving control of the first and second motors 2A, 2B made in the ring free state. According to this ring free control, in order to generate a target yaw moment, target torques can be generated in the first and second motors 2A, 2B (a ring free target torque control), and the first and/or second motors 2A, 2B can be controlled to achieve target rotation numbers (a ring free target rotation number control).

<Ring Free Target Torque Control>

In the ring free state, as has been described above, the connection between the first and second motors 2A, 2B and the rear wheels Wr is cut off, resulting in the state where no power is transmitted therebetween. However, by controlling the first motor 2A to generate therein a forward or reverse torque and the second motor 2B to generate therein a torque (a reverse or forward torque) having the same absolute value as that of the torque generated in the first motor 2A and acting in an opposite direction to the direction in which the torque of the first motor 2A acts, a lateral torque difference can be generated between the left rear wheel LWr and the right rear wheel RWr without generating a variation in rotation number in the first and second motors 2A, 2B so as to generate a desired yaw moment.

The ring free target torque control will be described based on a case where the same yaw moment M as that shown in FIG. 10A is generated by reference to FIG. 11A. Firstly, as with the ring lock control, a first motor base torque TM1$q$ of the first motor 2A and a second motor base torque TM2$q$ of the second motor 2B are determined based on the torque difference (TT1$p$−TT2$p$) between the left and right rear wheel torques TT1$p$, TT2$p$.

As with the ring lock control, when letting a target torque of the left rear wheel LWr be WTT1, a target torque of the right rear wheel RWr be WTT2, a total target torque (a sum of left rear wheel torque and right rear wheel torque) of the left and right rear wheels LWr, RWr be TRT, and a target torque difference between the left and right rear wheels LWr, RWr (a difference between left rear wheel torque and right rear wheel torque) be ΔTT, the equations (1) to (3) described above are established.

Here, in the ring free state, the torques of the first and second motors 2A, 2B which act in the same direction are not transmitted to the rear wheels Wr, and therefore, the total target torque TRT of the left and right rear wheels LWr, RWr is zero. Consequently, the target torques WTT1, WTT2 of the left and right rear wheels LWr, RWr are determined unambiguously from the equations (1), (2) described above.

Namely, $WWT1 = -WTT2 = \Delta TT/2$ \hfill (6)

In addition, when letting the target torque of the first motor 2A which is connected to the left rear wheel LWr be TTM1 and the target torque of the second motor 2B which is connected to the right rear wheel RWr be TTM2, the target torques TTM1, TTM2 of the left first and right second motors 2A, 2B are calculated from the equations (4), (5) described above.

From the equations (4) to (6) above, the target torques TTM1, TTM2 of the first and second motors 2A, 2B on the left and right sides are expressed by the following equations (7), (8).

$TTM1 = (1/\text{Ratio}) \cdot \Delta TT/2$ \hfill (7)

$TTM2 = -(1/\text{Ratio}) \cdot \Delta TT/2$ \hfill (8)

Then, in order to obtain the same yaw moment M as that shown in FIG. 10A, by making the target torque difference ΔTT between the left and right rear wheels LWr, RWr equal to the torque difference (TT1$p$−TT2$p$) between the left and right rear wheel torques TT1$p$, TT2$p$ that results when the ring lock control is performed, the target torques TTM1, TTM2 of the first and second motors 2A, 2B are determined. Then, the first and second motor base torques TM1$q$, TM2$q$ are obtained from the target torques TTM1, TTM2 of the first and second motors 2A, 2B which are determined in the way described above. As is clear from the equations (7), (8), the first and second motor base torques TM1$q$, TM2$q$ are the torques which have equal absolute values and which act in the opposite directions. Here, since a counterclockwise yaw moment M is generated, the first motor base torque TM1$q$ becomes a reverse torque, while the second motor base torque TM2$q$ becomes a forward torque.

Figure 11A:
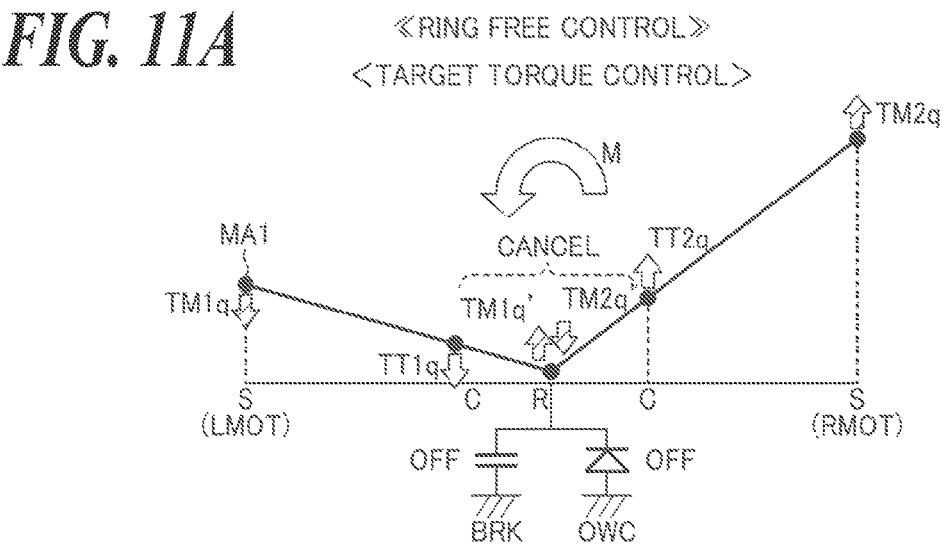
FIG. 11A is a velocity collinear diagram of the rear wheel driving system when a ring free target torque control is being performed.

As shown in FIG. 11A, by executing a torque control on the first motor 2A so that a reverse first motor base torque TM1$q$ is generated therein, the reverse first motor base torque TM1$q$ acts on the sun gear 21A. At that time, as with the state shown in FIG. 8, a forward torque (not shown) which attempts to move the vehicle forwards is being applied to the planetary carrier 23A from the axle 10A. Consequently, in the first planetary gear type speed reducer 12A, as a result of the forward first motor base torque TM1$q$ acting on the sun gear 21A which functions as a force point, with the planetary carrier 23A functioning as a support point, a forward first motor base torque distribution force TM1$q$' acts on the ring gears 24A, 24B which function as a action point.

On the other hand, by executing a torque control on the second motor 2B so that a forward second motor base torque TM2$q$ is generated therein, the forward second motor base torque TM2$q$ acts on the sun gear 21B. At that time, as with the state shown in FIG. 8, a forward torque (not shown) which attempts to move the vehicle forwards is being applied to the planetary carrier 23B from the axle 10B. Consequently, in the second planetary gear type speed reducer 12B, as a result of the forward second motor base torque TM2$q$ acting on the sun gear 21B which functions as a force point, with the planetary carrier 23B functioning as a support point, a reverse second motor base torque distribution force TM2$q$' acts on the ring gears 24A, 24B which function as a action point.

Here, since the first motor base torque TM1$q$ and the second motor base torque TM2$q$ are the torques having the equal absolute values and acting in the opposite directions, the reverse first motor base torque distribution force $TM1q'$ and the forward second motor base torque distribution force $TM2q'$ which act on the ring gears 24A, 24B cancel out each other (cancel). Consequently, the first motor base torque $TM1q$ and the second motor base torque $TM2q$ do not contribute to a variation in rotation, and therefore, the sun gears 21A, 21B and the ring gears 24A, 24B are maintained in their rotating states. A reverse left rear wheel torque $TT1q$ which results from multiplying the first motor base torque $TM1q$ by the reduction gear ratio of the first planetary gear type speed reducer 12A acts on the planetary carrier 23A, and a forward right rear wheel torque $TT2q$ which results from multiplying the second motor base torque $TM2q$ by the reduction gear ratio of the second planetary gear type speed reducer 12B acts on the planetary carrier 23B.

The reduction gear ratios of the first and second planetary gear type speed reducers 12A, 12B are equal, and therefore, the left and right rear wheel torques $TT1q$, $TT2q$ become torques having the same absolute value and acting in the opposite directions. In the vehicle 3, a torque difference ($TT1q$–$TT2q$) between the left and right rear wheel torques $TT1q$, $TT2q$ which equals the torque difference ($TT1p$–$TT2q$) between the left and right rear wheel torques $TT1p$, $TT2q$ which results when the ring lock control is performed is generated, whereby the counterclockwise yaw moment M is maintained.

<Ring Free Target Rotation Number Control>

In the ring free state, that is, in such a state that the one-way clutch 50 is disengaged and the hydraulic brakes 60A, 60B are released, even though torques are generated from the first and second motors 2A, 2B in the same direction, since the ring gears 24A, 24B which are connected together are not locked and the aforesaid cancel of the motor torque distribution forces is not generated, no torque is transmitted to the rear wheels Wr, but only a variation in rotation number is generated in the sun gears 21A, 21B (the first and second motors 2A, 2B) and the ring gears 24A, 24B.

In this case, by generating the rotation control torques having the equal absolute values and acting in the same direction in the first and second motors 2A, 2B, the first motor 2A and/or the second motor 2B can be controlled to achieve the desired rotation number without transmitting the rotational control torques to the rear wheels Wr.

Figure 11B:
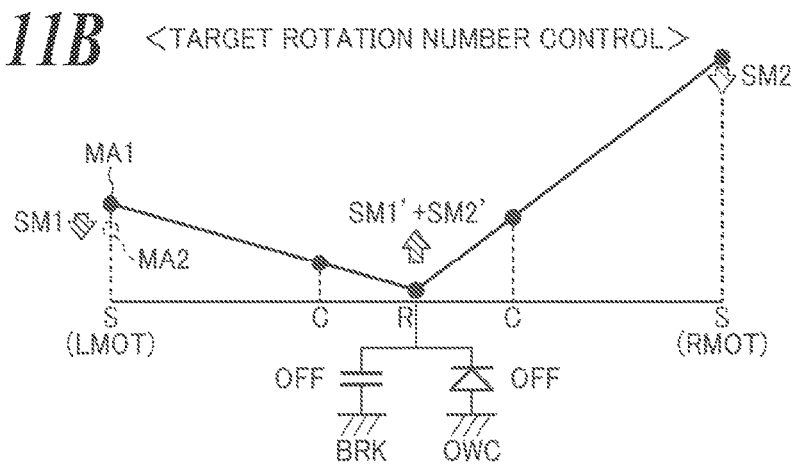
FIG. 11B is a velocity collinear diagram of the rear wheel driving system when a ring free target rotation number control is being performed.

Referring to FIG. 11B, this will be described specifically by taking, for example, a case where the rotation numbers of the first and second motors 2A, 2B are reduced from the state shown in FIG. 11A, that is, a case where the rotation number MA1 (hereinafter, referred to as a motor actual rotation number) is reduced to the target rotation number MA2 (hereinafter, referred to as a motor target rotation number) of the first motor 2A as an example. By executing a torque control on the first motor 2A so that a reverse first rotation control torque SM1 is generated therein, the reverse first rotation control torque SM1 acts on the sun gear 21A. At that time, as with the state shown in FIG. 8, a forward torque (not shown) which attempts to move the vehicle forwards is being applied to the planetary gear 23A from the axle 10A. Consequently, in the first planetary gear type speed reducer 12A, as a result of the reverse first rotation control torque SM1 acting on the sun gear 21A which functions as a force point, with the planetary carrier 23A functioning as a support point, a forward first rotation control torque distribution force SM1' acts on the ring gears 24A, 24B which function as a action point.

Similarly, by executing a torque control on the second motor 2B so that a reverse second rotation control torque SM2 is generated therein, the reverse second rotation control torque SM2 acts on the sun gear 21B. At that time, as with the state shown in FIG. 8, a forward torque (not shown) which attempts to move the vehicle forwards is being applied to the planetary carrier 23B from the axle 10B. Consequently, in the second planetary gear type speed reducer 12B, as a result of the reverse second rotation control torque SM2 acting on the sun gear 21B which functions as a force point, with the planetary carrier 23B functioning as a support point, a forward second rotation control torque distribution force SM2' acts on the ring gears 24A, 24B which function as a action point.

Here, since the first and second rotation control torques SM1, SM2 are torques which have the equal absolute values and which act in the same direction, the first and second rotation control torque distribution forces SM1', SM2' which act on the ring gears 24A, 24B also become torques which have the equal absolute values and which act in the same direction, and the first and second rotation control torque distribution forces SM1', SM2' act in a direction in which the rotation number of the ring gears 24A, 24B are increased. At that time, since there exist no torques matching the first and second rotation control torques SM1, SM2 in the first and second planetary gear type speed reducers 12A, 12B, left and right rear wheel torques based on the first and second rotation control torques SM1, SM2 are not generated in the planetary carriers 23A, 23B. Consequently, the first and second rotation control torques SM1, SM2 only contribute to the variation in rotation and reduces the rotation numbers of the first and second motors 2A, 2B and the rotation numbers of the sun gears 21A, 21B, and the first and second rotation control torque distribution forces SM1', SM2' increase the rotation number of the ring gears 24A, 24B. In this way, by generating the first and second rotation control torques SM1, SM2 as required, the first motor 2A can be controlled to achieve an arbitrary rotation number, and then, the first motor 2A achieves the target motor rotation number MA2. The first and second rotation control torques SM1, SM2 are calculated from a difference between the motor actual rotation number MA1 and the motor target rotation number MA2.

Due to the ring gears 24A, 24B being connected to each other, there are situations where the rear wheel driving system 1 cannot control the motor target rotation number of the first motor 2A and the motor target rotation number of the second motor 2B satisfactorily in a simultaneous fashion. In that case, a target rotation number control is performed on one of the motors so that the motor target rotation number of the one motor is satisfied. FIG. 11B illustrates a case where the motor target rotation number of the first motor 2A is controlled.

<Ring Free Target Torque Control+Ring Free Target Rotation Number Control>

FIGS. 11A and 11B describe separately the ring tree target torque control in which the target torques are generated in the first and second motors 2A, 2B so as to generate the target yaw moment and the ring free target rotation number control in which the first motor 2A and/or the second motor 2B is controlled so that the target rotation number is achieved therein. By executing both the ring free target torque control and the ring free target rotation number control at the same time, the first motor 2A and/or the second motor 2B can be controlled to achieve the desired rotation number while allowing the desired yaw moment to be generated.

Figure 11C:
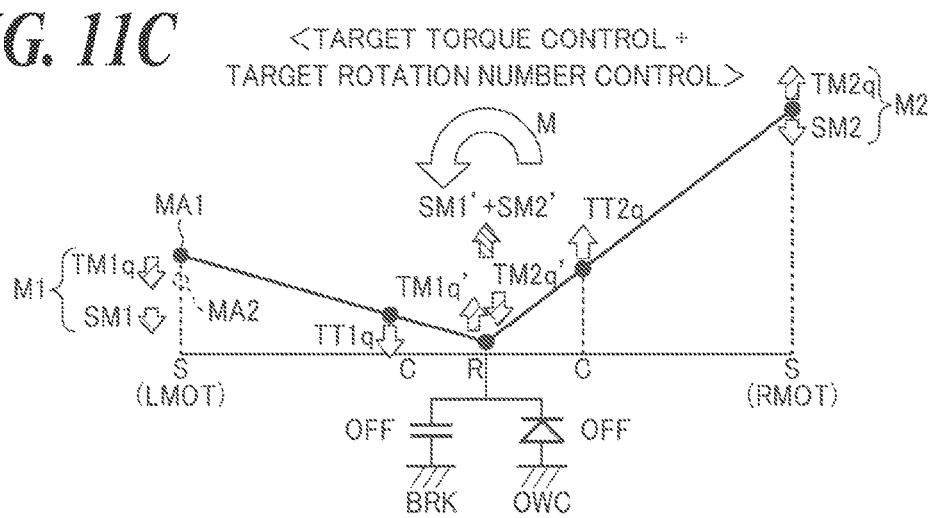
FIG. 11C is a velocity collinear diagram of the rear wheel driving system when both the ring free target torque control and the ring free target rotation number control are being performed.

FIG. 11C is a diagram describing together the first and second motor base torques $TM1q$, $TM2q$ of the first and second motors 2A, 2B and the first and second motor base torque distribution forces TM1$q'$, TM2$q'$ which are the distribution forces of the first and second motor base torques TM1$q$, TM2$q$ which are shown in FIG. 11A and the first and second rotation control torques SM1, SM2 and the first and second rotation control torque distribution forces SM1', SM2' which are the distribution forces of the first and second rotation control torques SM1, SM2 which are shown in FIG. 11B.

In this case, in reality, a reverse first motor torque M1 (the first motor base torque TM1$q$+the first rotation control torque SM1) is generated from the first motor 2A, and a forward second motor torque M2 (the second motor base torque TM2$q$+the second rotation control torque SM2) is generated from the second motor 2B, whereby a reverse left rear wheel torque TT1$q$ acts on the planetary carrier 23A, and a forward right rear wheel torque TT2$q$ acts on the planetary carrier 23B, generating a counterclockwise yaw moment M. Additionally, at the same time, the motor actual rotation number MA1 of the first motor 2A and the rotation number of the sun gear 21A are decreased, while the rotation number of the ring gears 24A, 24B are increased. Then, the actual rotation number MA1 of the first motors 2A achieves a motor target rotation number MA2.

As methods of determining target rotation numbers when the ring free target rotation number control is performed, there will be described below two modes (I) and (II).

(I) A first mode is a mode in which the target rotation number control is performed based on the target rotation numbers of the motors or more particularly a mode in which the target rotation number control is performed based on the target rotation numbers of the motors which are based on the efficiencies of the motors. Namely, the first mode is a mode in which the motor target rotation numbers of the first and second motors 2A, 2B are set based on at least either the efficiencies of the first and second motors 2A, 2B or the efficiency of an electric power supply unit which supplies electric power to the motors. In such a state that the ring gears 24A, 24B are locked by the hydraulic brakes 60A, 60B and/or the one-way clutch 50, the rotation numbers of the first and second motors 2A, 2B and the rotation numbers of the sun gears 21A, 21B are linked with the rotations of the planetary carriers 23A, 23B and become predetermined rotation numbers which correspond to the reduction gear ratios of the first and second planetary gear type speed reducers 12A, 12B. On the other hand, in such a state that the ring gears 24A, 24B are not locked, that is, in the ring free state, the rotation numbers of the first and second motors 2A, 2B and the rotation numbers of the suit gears 21A, 21B are not linked with the rotations of the planetary carriers 23A, 23B and can be arbitrary rotation numbers. It is noted that the electric power supply unit is a PDU which includes an inverter, not shown, or a three-phase line and is mainly the PDU. In this way, by determining the motor target rotation numbers based on the efficiencies of the motors and the efficiency of the PDU which occupy largely the efficiency of the electric power supply system, the consumption of electric power can be reduced further. Additionally, the motor target rotation numbers may be determined based on only the efficiencies of the motors. In this case, when efficiencies are determined experimentally, an efficiency map can easily be prepared, while when efficiencies are determined through sequential detections and estimations, control quantities can be reduced.

(II) A second mode is a mode in which the target rotation number control is performed based on the target rotation numbers of the planetary gears 22A, 22B and more particularly a mode in which the planetary gears 22A, 22B are controlled so that their rotational directions are not reversed in the ring free state.

Figure 12:
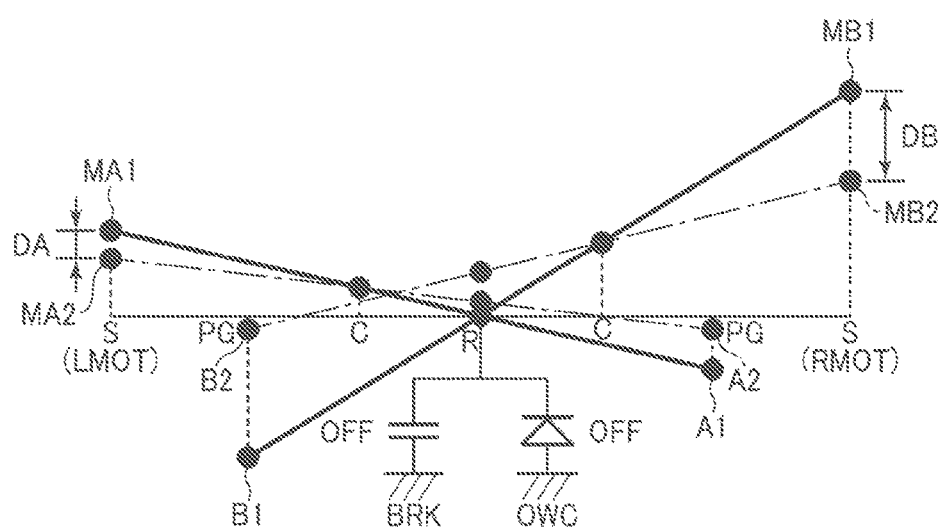
FIG. 12 is a velocity collinear diagram of the rear wheel driving system which describes a ring free target rotation number control when a rotation number difference of the first motor and a rotation number difference of the second motor differ from each other.

As FIGS. 11A to 11C does, FIG. 12 shows a state where the vehicle 3 is taking a left turn. In the figure, a point (A1) on an extension of a line which connects the sun gear 21A (S), the planetary carrier 23A (C), and the ring gear 24A (R) of the first planetary gear type speed reducer 12A represents a rotation number of the planetary gear 22A (when it rotates on its own axis), and a point (B1) on an extension of a line which connects the sun gear 21B (S), the planetary carrier 23B (C), and the ring gear 24B (R) of the second planetary gear type speed reducer 12B represents a rotation number of the planetary gear 22B (when it rotates on its own axis).

In the ring free state, the sun gears 21A, 21B (S), the planetary gears 22A, 22B (PG) and the ring gears 24A, 24B (R) other than the planetary carriers 23A, 23B (C) which are connected to the left rear wheel LWr and the right rear wheel RWr can be set to arbitrary rotation numbers. Here, a case is presumed where a release command of the hydraulic brakes 60A, 60B is inputted from the ring lock control as shown in FIG. 10A. As shown in FIG. 12, a planetary gear target rotation number A2 is set to a rotation number in the vicinity of a zero rotation so that the rotational direction of the planetary gear 22A which is rotating reversely at the rotation number A1 in the first planetary gear type speed reducer 12A is not reversed and that the rotation number (the absolute value) becomes small, and a rotation number difference DA between the motor actual rotation number MA1 of the first motor 2A and the motor target rotation number MA2 of the first motor 2A which is determined based on the planetary gear target rotation number A2 and the rotation number of the planetary carrier 23A or the rotation number of the left rear wheel LWr is calculated.

Similarly, a planetary gear target rotation number B2 is set to a rotation number in the vicinity of a zero rotation so that the rotational direction of the planetary gear 22B which is rotating reversely at the rotation number B1 in the second planetary gear type speed reducer 12B is not reversed and that the rotation number (the absolute value) becomes small, and a rotation number difference DB between the motor actual rotation number MB1 of the second motor 2A and the motor target rotation number MB2 of the second motor 2B which is determined based on the planetary gear target rotation number B2 and the rotation number of the planetary carrier 23B or the rotation number of the right rear wheel RWr is calculated.

Then, the rotation number difference DA of the first motor 2A and the rotation number difference DB of the second motor 2B are compared, and the first motor 2A whose rotation number difference is smaller is selected as the motor which executes the target rotation number control. In this way, by selecting the motor whose rotation number difference is smaller as the motor which executes the target rotation number control, it is possible to suppress the excessive control of the motor whose rotation number difference is larger, that is, the motor which is not controlled to achieve the motor target rotation number. Should the second motor 2B which is the motor having the larger rotation number difference be selected as the motor which executes the target rotation number control, the first motor 2A whose rotation number difference is smaller is controlled excessively, the rotation number of the planetary gear 22A of the first planetary gear type speed reducer 12A exceeds the target rotation number and the rotational direction thereof is reversed so that the planetary gear 22A rotates forwards. The generation of a backlash can be prevented by executing the target rotation number control so that the rotational directions of the planetary gears 22A, 22B are not reversed.

In addition, the calculation of the motor target rotation numbers described under (II) and the calculation of the motor target rotation numbers described under (I) may be performed in parallel. Namely, the calculation of the motor target rotation numbers based on the planetary gear target rotation numbers and the calculation of the motor target rotation numbers based on the efficiencies of the motors and the efficiency of the electric power supply unit which supplies electric power to the motors may be performed in parallel. This can reduce the consumption of electric power while preventing the generation of a backlash. However, when there exists no motor rotation number which satisfies simultaneously the motor target rotation numbers determined based on the planetary gear target rotation numbers and the motor target rotation numbers determined based on the efficiencies of the motors and the efficiency of the electric power supply unit which supplies electric power to the motors, it is preferable that priority is given to the motor target rotation numbers determined based on the planetary gear target rotation numbers. In this configuration, by causing the prevention of backlash generation to take priority over the efficiencies of the motors, the driving comfort of the vehicle can be enhanced.

Following this, the shift from the ring lock control to the ring free target torque control, which characterizes the invention, will be described in a time series fashion based on FIGS. 13A to 13C.

Figure 13A:
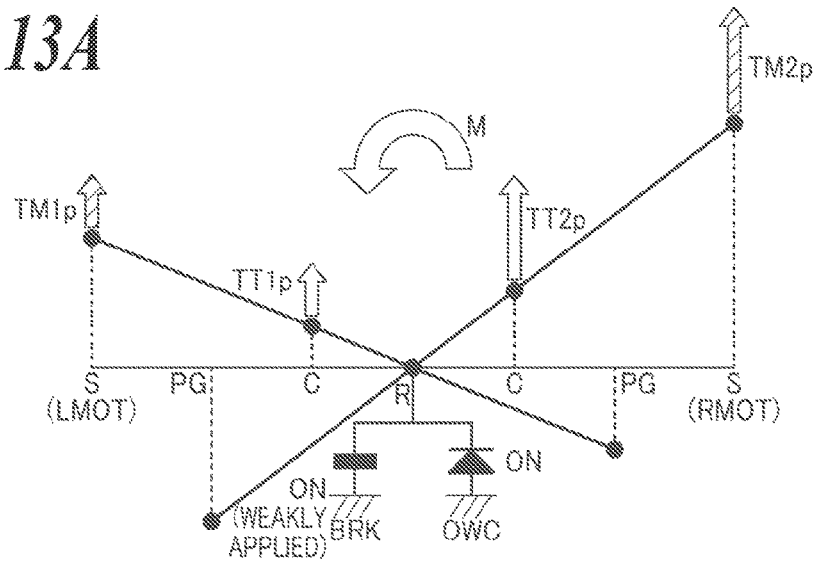
FIGS. 13A to 13C show velocity collinear diagrams of the rear wheel driving system when the control is shifted from a ring lock control to the ring free target torque control in a time-series fashion.
Figure 13B:
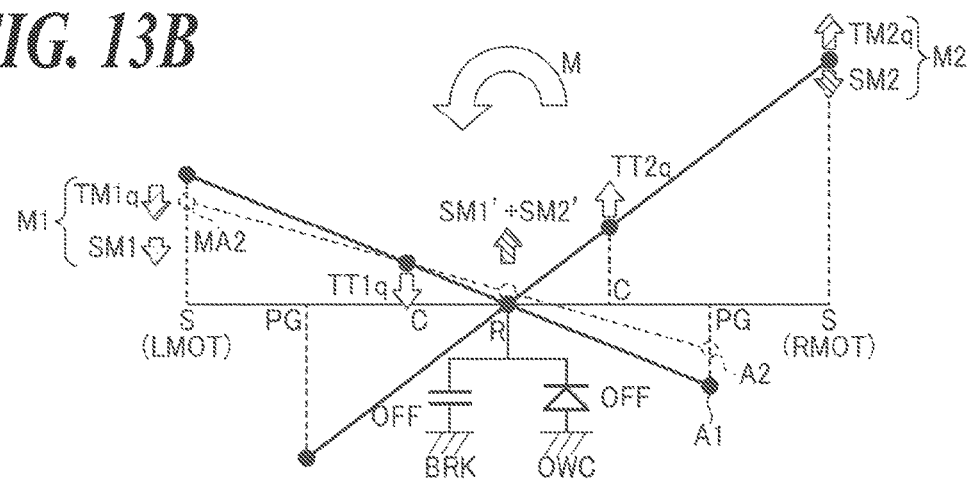

FIG. 13A is a diagram similar to FIG. 10A which describes the state where the ring lock control is being performed. When the vehicle speed exceeds a certain threshold to reach the forward traveling at high vehicle speeds in this state, a shift command from the ring lock state to the ring free state is inputted to prevent the excessive rotation of the first and second motors 2A, 2B.

Figure 14:
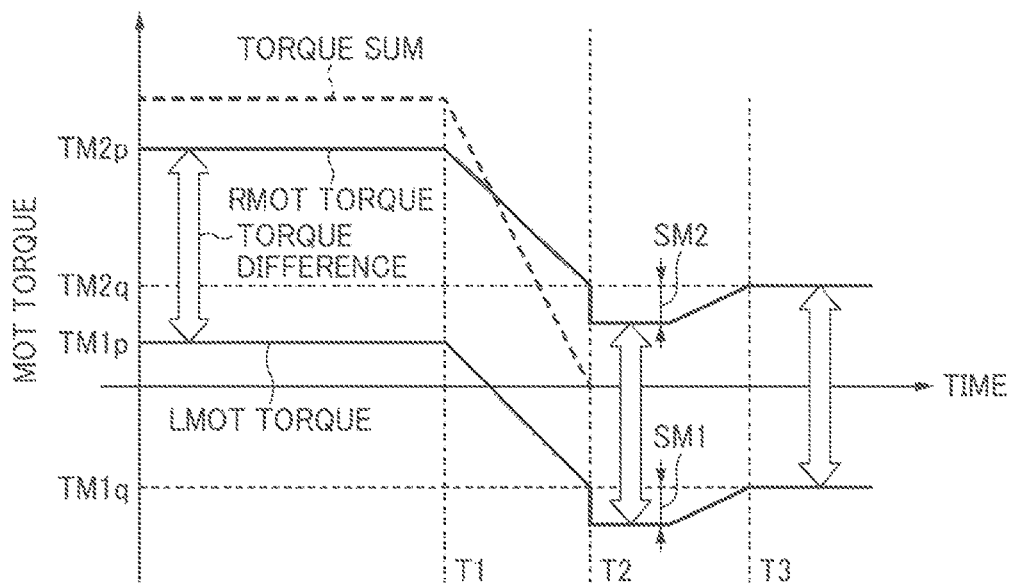
FIG. 14 is a graph showing a torque sum and a torque difference of the first and second motors when the control is shifted from the ring lock control to the ring free target torque control.

As shown in FIG. 14, when the shift command is inputted at a time T1, the first and second motor base torques TM1$q$, TM2$q$ are determined so that the torque sum (TT1$p$+TT2$p$) of the left and right rear wheel torques TT1$p$, TT2$p$ becomes zero while maintaining the torque difference (TT1$p$−TT2$p$) between the left and right rear wheel torques TT1$p$, TT2$p$ so as to maintain the counterclockwise yaw moment M resulting when the ring lock control is performed.

Then, the torques to be generated are shifted from the first and second motor base torques TM1$p$, TM2$p$ that are generated when the ring lock control is performed to the first and second motor base torques TM1$q$, TM2$q$ while maintaining the torque difference (TM1$p$−TM2$p$) between the first and second motor base torques TM1$p$, TM2$p$. At that time, the first and second motors 2A, 2B are controlled so that the torque sum of the first and second motor base torques TM1$p$, TM2$p$ gradually decreases. Since the reduction gear ratios of the first and second planetary gear type speed reducers 12A, 12B are equal, the torque difference (TT1$p$−TT2$p$) between the left and right rear wheel torques TT1$p$, TT2$p$ can be maintained by maintaining the torque difference (TM1$p$−TM2$p$) between the first and second motor base torques TM1$p$, TM2$p$, whereby the yaw moment M can be kept generated in a stable fashion. Additionally, the torque sum (TT1$p$+TT2$p$) of the left and right rear torques TT1$p$, TT2$p$ gradually decreases by reducing gradually the torque sum of the first and second motor base torques TM1$p$, TM2$p$ from the torque sum (TM1$p$+TM2$p$) at the time T1 towards zero, whereby the acceleration force decreases gradually.

The torque sum of the first and second motor base torques TM1$p$, TM2$p$ decreases gradually from the time T1 to a time T2 and becomes zero at the time T2. When the torque sum of the first and second motor base torques TM1$p$, TM2$p$ becomes zero, the one-way clutch 50 is shifted from the engaged state to the disengaged state since the forward torques of the first and second motors 2A, 2B are not inputted into the rear wheels Wr. Additionally, the hydraulic brakes 60A, 60B are controlled to be shifted from the weakly applied state to the released state at the time T2. By doing so, as shown in FIG. 13B, the rear wheel driving system 1 is put in the ring free state.

In the ring free state, in addition to the ring free target torque control which maintains the yaw moment M, the ring free target rotation number control (here, the mode of (II) above will be described) is performed in which the first and second motors 2A, 2B are controlled so as to achieve the desired rotation numbers. As has been described above, the planetary gear target rotation number A2 is set to the rotation number in the vicinity of the zero rotation so that the rotational direction of the planetary gear 22A which is rotating reversely at the rotation number A1 in the first planetary gear type speed reducer 12A is not reversed and that the rotation number (the absolute value) becomes small, and the rotation number difference DA between the motor actual rotation number MA1 of the first motor 2A and the motor target rotation number MA2 of the first motor 2A which is determined based on the planetary gear target rotation number A2 and the rotation number of the planetary carrier 23A or the rotation number of the left rear wheel LWr is calculated. Similarly, the planetary gear target rotation number B2 is set to the rotation number in the vicinity of the zero rotation so that the rotational direction of the planetary gear 22B which is rotating reversely at the rotation number B1 in the second planetary gear type speed reducer 12B is not reversed and that the rotation number (the absolute value) becomes small, and the rotation number difference DB between the motor actual rotation number MB1 of the second motor 2B and the motor target rotation number MB2 of the second motor 2B which is determined based on the planetary gear target rotation number B2 and the rotation number of the planetary carrier 23B or the rotation number of the right rear wheel RWr is calculated. Then, the rotation number difference DA of the first motor 2A and the rotation number difference DB of the second motor 2B are compared, and the first motor 2A whose rotation number difference is smaller is selected as the motor which executes the target rotation number control.

From the time T2 to a time T3, in addition to the first and second motor base torques TM1$q$, TM2$q$, the first and second rotation control torques SM1, SM2 which have the equal absolute values and which acts in the same direction (both acting in the reverse direction) are generated from the first and second motors 2A, 2B as the torques which contribute to the target rotation number control. In reality, the first motor torque M1 (the first motor base torque TM1$q$+the first rotation control torque SM1) is generated from the first motor 2A, and the second motor torque M2 (the second motor base torque TM2$q$+the second rotation control torque SM2) is generated from the second motor 2B. In this state, too, since the first and second rotation control torques SM1, SM2 are the torques which have the equal absolute values and which act in the same direction (the reverse direction), the torque difference (TM1$q$−TM2$q$) between the first and second motor base torques TM1$q$, TM2$q$ which equals the torque difference (TM1$p$−TM2$p$) between the first and second motor base torques TM1$p$, TM2$p$ which result when the ring lock control is performed is maintained. Consequently, the reverse left rear wheel torque TT1$q$ acts on the planetary carrier 23A, and the forward right rear wheel torque TT2$q$ acts on the planetary carrier 23B, whereby the torque difference (TT1$q$−TT2$q$) between the left and right rear wheel torques TT$q$, TT2$q$ which equals the torque difference (TT1$p$−TT2$p$) between the left and right rear wheel torques TT1$p$, TT2$p$ which result when the ring lock control is performed is maintained, which keeps the counterclockwise yaw moment M generated.

Figure 13C:
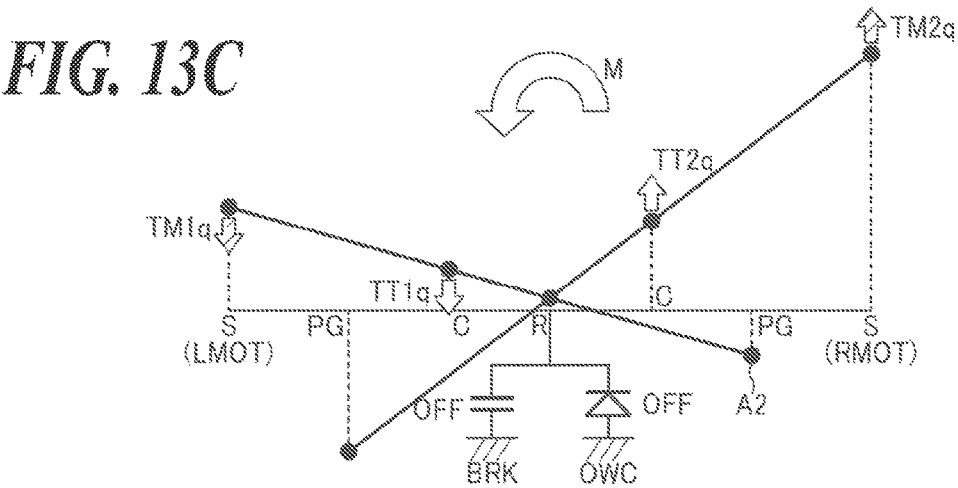

As shown in FIG. 13C, the first and second rotation control torques SM1, SM2 are caused to disappear at a point in time when the motor actual rotation number MA1 of the first motor 2A becomes the motor target rotation number MA2 at the time T3. The rotation number of the second motor 2B and the rotation number of the sun gear 21B then are determined unambiguously by the rotation number of the planetary carrier 23B which is connected to the right rear wheel RWr and the rotation number of the ring gears 24A, 24B.

From the time T3 on, since the ring free target torque control continues, the first and second motor base torques TM1$q$, TM2$q$ which have the equal absolute values and which act in the opposite directions are generated from the first and second motors 2A, 2B, whereby the torque difference (TM1$q$−TM2$q$) between the first and second motor base torques TM1$q$, TM2$q$ which equals the torque difference (TM1$p$−TM2$p$) between the first and second motor base torques TM1$p$, TM2$p$ which result when the ring lock control is performed is maintained, and the torque difference (TT1$q$−TT2$q$) between the left and right rear wheel torques TT1$q$, TT2$q$ which equals the torque difference (TT1$p$−TT2$p$) between the left and right rear wheel torques TT1$p$, TT2$p$ which result when the ring lock control is performed is maintained. This keeps the counterclockwise yaw moment M generated.

Thus, as has been described heretofore, when the control is shifted from the ring lock control to the ring free control, the first and second motors 2A, 2B are controlled so that the torque sum (TM1$p$+TM2$p$) of the first and second motor base torques TM1$p$, TM2$p$ of the first and second motors 2A, 2B approaches zero while maintain the torque difference (TM1$p$−TM2$p$) between the first and second motor base torques TM1$p$, TM2$p$ of the first and second motors 2A, 2B, whereby the generation of yaw moment M can be maintained constant from the ring lock state to the ring free state. Further, the state change of the vehicle 3 in the front-to-rear direction can be reduced. At that time, the torque sum (TM1$p$+TM2$p$) of the first and second motor base torques TM1$p$, TM2$p$ of the first and second motors 2A, 2B is restrained from changing quickly and drastically so as to decrease gradually towards zero as indicated by a dotted line in FIG. 14, whereby the state change of the vehicle 3 in the front-to-rear direction can be suppressed in a more ensured fashion.

The invention is not limited to the embodiment that has been described heretofore and hence can be modified and improved as required.

For example, the hydraulic brakes 60A, 60B do not have to be provided individually on the ring gears 24A, 24B, and hence, at least one hydraulic brake should be provided on the ring gears 24A, 24B which are connected together, and further, the one-way clutch does not necessarily have to be provided. In this case, by controlling the hydraulic brake to be shifted from the released state to the applied state, the shift from the ring lock state to die ring free state can be achieved.

In addition, while the hydraulic brakes are described as functioning as the rotation restricting unit, the invention is not limited thereto, and hence, it is possible to select arbitrary rotation restricting unit including mechanical or electromagnetic ones.

Additionally, the first and second motors 2A, 2B are connected to the sun gears 21A, 21B so that the ring gears are connected to each other. However, the invention is not limited to that configuration, and hence, a configuration may be adopted in which the sun gears are connected together and the first and second motors are connected to the ring gears.

In addition, the front wheel driving system may use only the motor as a sole driving source thereof without using the internal combustion engine.

This patent application is based on Japanese Patent Application (No. 2012-082933) filed on Mar. 30, 2012, the contents of which are incorporated herein by reference.

DESCRIPTION OF REFERENCE NUMERALS AND CHARACTERS

1 Rear wheel driving system
2A First motor
2B Second motor
8 Controller (motor controller, rotation restricting unit controller)
12A First planetary gear type speed reducer (first speed changer)
12B Second planetary gear type speed reducer (second speed changer)
21A, 21B Sun gear (first rotational element)
22A, 22B Planetary gear (fourth rotational element)
23A, 23B Planetary carrier (second rotational element)
24A, 24B Ring gear (third rotational element)
60A, 60B Hydraulic brake (rotation restricting unit)
LWr Left rear wheel (left wheel)
RWr Right rear wheel (right wheel)

The invention claimed is:

1. A vehicle driving system comprising:
a left wheel driving system having a first motor which drives a left wheel of a vehicle and a first speed changer which is provided on a power transmission path between the first motor and the left wheel; a right wheel driving system having a second motor which drives a right wheel of the vehicle and a second speed changer which is provided on a power transmission path between the second motor and the right wheel; and a motor controller which controls the first motor and the second motor, wherein:
the first and the second speed changers each has first to third rotational elements;
the first motor is connected to the first rotational element of the first speed changer;
the second motor is connected to the first rotational element of the second speed changer;
the left wheel is connected to the second rotational element of the first speed changer;
the right wheel is connected to the second rotational element of the second speed changer;
the third rotational element of the first speed changer and the third rotational element of the second speed changer are connected to each other;
the vehicle driving system further includes:

a rotation restricting mechanism comprising a first brake and a second brake and configured to shift between a released state and an applied state and which restricts a rotation of the third rotational elements when shifted to the applied state; and a rotation restricting unit controller which controls the rotation restricting mechanism such that the rotation restricting mechanism is shifted between the released state and the applied state; and in a process of shifting the rotation restricting mechanism from the applied state to the released state by the rotation restricting unit controller, the motor controller controls the first motor and the second motor so that a torque sum of the first motor and the second motor approaches zero while maintaining a torque difference between the first motor and the second motor.

2. The vehicle driving system according to claim 1, wherein after the torque sum of the first motor and the second motor becomes zero, the rotation restricting unit controller shifts the rotation restricting mechanism to the released state.

3. The vehicle driving system according to claim 1, wherein when the first motor and the second motors are controlled so that the torque sum of the first motor and the second motor approaches zero, the torque sum is controlled to gradually decrease towards zero.

4. The vehicle driving system according to claim 1, wherein in the process of shifting the rotation restricting mechanism to the released state, the motor controller determines a target rotation state quantity of the first motor based on at least one of an efficiency of the first motor and an efficiency of an electric power supply unit which supplies electric power to the first motor.

5. The vehicle driving system according to claim 4, wherein the motor controller:
   obtains the target rotation state quantity of the first motor, an actual rotation state quantity of the first motor, the target rotation state quantity of the second motor, and an actual rotation state quantity of the second motor;
   determines a first rotation state quantity difference which is a rotation state quantity difference between the target rotation state quantity of the first motor and the actual rotation state quantity of the first motor, and a second rotation state quantity difference which is a rotation state quantity difference between the target rotation state quantity of the second motor and the actual rotation state quantity of the second motor,
   determines a rotation state quantity control torque based on either smaller one of the first rotation state quantity difference and the second rotation state quantity difference; and
   determines both a control torque of the first motor and a control torque of the second motor based on the rotation state quantity control torque.

6. The vehicle driving system according to claim 1, wherein:
   the first and the second speed changers each has a fourth rotational element which is supported by the second rotational element to be capable of revolving and which meshes with the first rotational element and the third rotational element; and
   in the process of shifting the rotation restricting mechanism to the released state, the motor controller determines a target rotation state quantity of the first motor or the second motor based on a target rotation state quantity of the fourth rotational element.

7. The vehicle driving system according to claim 6, wherein the target rotation state quantity of the fourth rotational element is set so that a rotational direction of the fourth rotational element which is rotating in one direction or an opposite direction opposite to the one direction is not to be reversed.

8. The vehicle driving system according to claim 6, wherein:
   the target rotation state quantity of the first motor is determined further based on an actual rotation state quantity of the second rotational element of the first speed changer or an actual rotation state quantity of the left wheel.

9. The vehicle driving system according to claim 6, wherein:
   the target rotation state quantity of the second motor is determined further based on an actual rotation state quantity of the second rotational element of the second speed changer or an actual rotation state quantity of the right wheel.

10. The vehicle driving system according to claim 1, wherein in the process of shifting the rotation restricting mechanism to the released state, the motor controller determines a target rotation state quantity of the second motor based on at least one of an efficiency of the second motor and an efficiency of an electric power supply unit which supplies electric power to the second motor.

* * * * *